United States Patent
Hauser et al.

(10) Patent No.: US 6,223,531 B1
(45) Date of Patent: May 1, 2001

(54) HOUSING AND CENTER SECTION FOR HYDROSTATIC TRANSMISSION

(75) Inventors: Raymond M. Hauser; Lonnie E. Holder, both of Sullivan, IL (US); John D. Schreier, Fitchburg, WI (US); Ronald J. Sporrer; Michael Lee Bennett, both of Sullivan, IL (US)

(73) Assignee: Hydro Gear Limited Partnership, Sullivan, IL (US)

( * ) Notice: Subject to any disclaimer, the term of this patent is extended or adjusted under 35 U.S.C. 154(b) by 0 days.

(21) Appl. No.: 09/196,181

(22) Filed: Nov. 20, 1998

(51) Int. Cl.[7] .................................................. F16D 39/00
(52) U.S. Cl. .................. 60/487; 60/489; 60/491
(58) Field of Search .......................... 60/487, 488, 489, 60/490, 491, 492

(56) References Cited

U.S. PATENT DOCUMENTS

| | | | |
|---|---|---|---|
| 4,167,855 | 9/1979 | Knapp | 60/445 |
| 4,856,368 | 8/1989 | Fujisaki et al. | 74/606 |
| 4,870,820 | 10/1989 | Nemoto | 60/487 |
| 4,899,541 | 2/1990 | Okada et al. | 60/464 |
| 4,905,472 | 3/1990 | Okada | 60/464 |
| 4,914,907 * | 4/1990 | Okada | 60/487 |
| 4,932,209 | 6/1990 | Okada et al. | 60/487 |
| 4,986,073 | 1/1991 | Okada et al. | 60/454 |
| 5,042,252 | 8/1991 | Havens et al. | 60/487 |
| 5,074,195 | 12/1991 | Ohashi et al. | 92/57 |
| 5,094,077 | 3/1992 | Okada | 60/436 |
| 5,136,845 | 8/1992 | Woodley | 60/468 |
| 5,146,748 | 9/1992 | Okada | 60/454 |
| 5,163,293 | 11/1992 | Azuma et al. | 60/487 |
| 5,182,966 | 2/1993 | von Kaler et al. | 74/606 |
| 5,201,692 | 4/1993 | Johnson et al. | 475/74 |
| 5,289,738 | 3/1994 | Szulczewski | 74/606 R |
| 5,311,740 | 5/1994 | Shiba et al. | 60/453 |
| 5,314,387 | 5/1994 | Hauser et al. | 475/74 |
| 5,333,451 | 8/1994 | Sakikawa et al. | 60/468 |
| 5,339,631 | 8/1994 | Ohashi | 60/487 |
| 5,373,697 | 12/1994 | Jolliff et al. | 60/454 |
| 5,440,951 | 8/1995 | Okada et al. | 74/606 R |
| 5,546,752 | 8/1996 | Horton et al. | 60/464 |
| 5,555,727 | 9/1996 | Hauser et al. | 60/488 |
| 5,588,294 | 12/1996 | Sakakura et al. | 60/464 |
| 5,771,758 * | 6/1998 | Hauser | 74/606 |
| 5,794,443 | 8/1998 | Shimizu et al. | 60/456 |
| 5,819,537 * | 10/1998 | Okada et al. | 60/487 |
| 5,836,159 | 11/1998 | Shimizu et al. | 60/487 |

OTHER PUBLICATIONS

Photograph dated '96 3 4 of Model 310–3000 integrated hydrostatic transaxle.

* cited by examiner

Primary Examiner—Edward K. Look
Assistant Examiner—Thomas E. Lazo
(74) Attorney, Agent, or Firm—Thomas C. McDonough; John E. Hyatt

(57) ABSTRACT

A hydrostatic transmission design incorporating a unique housing shape and configuration, including a vertical split of the two casing elements, which are shaped to conform to the internal components of the transmission. The center section of the transmission has a unique configuration including a trunnion mounted swash plate, means for mounting the center section to the transmission and a motor output shaft mounted below the pump running surface. The transmission also includes an expansion chamber, preferably secured externally to the sump, having a tube mounted therein to transfer hydraulic fluid between the chamber and the sump.

3 Claims, 26 Drawing Sheets

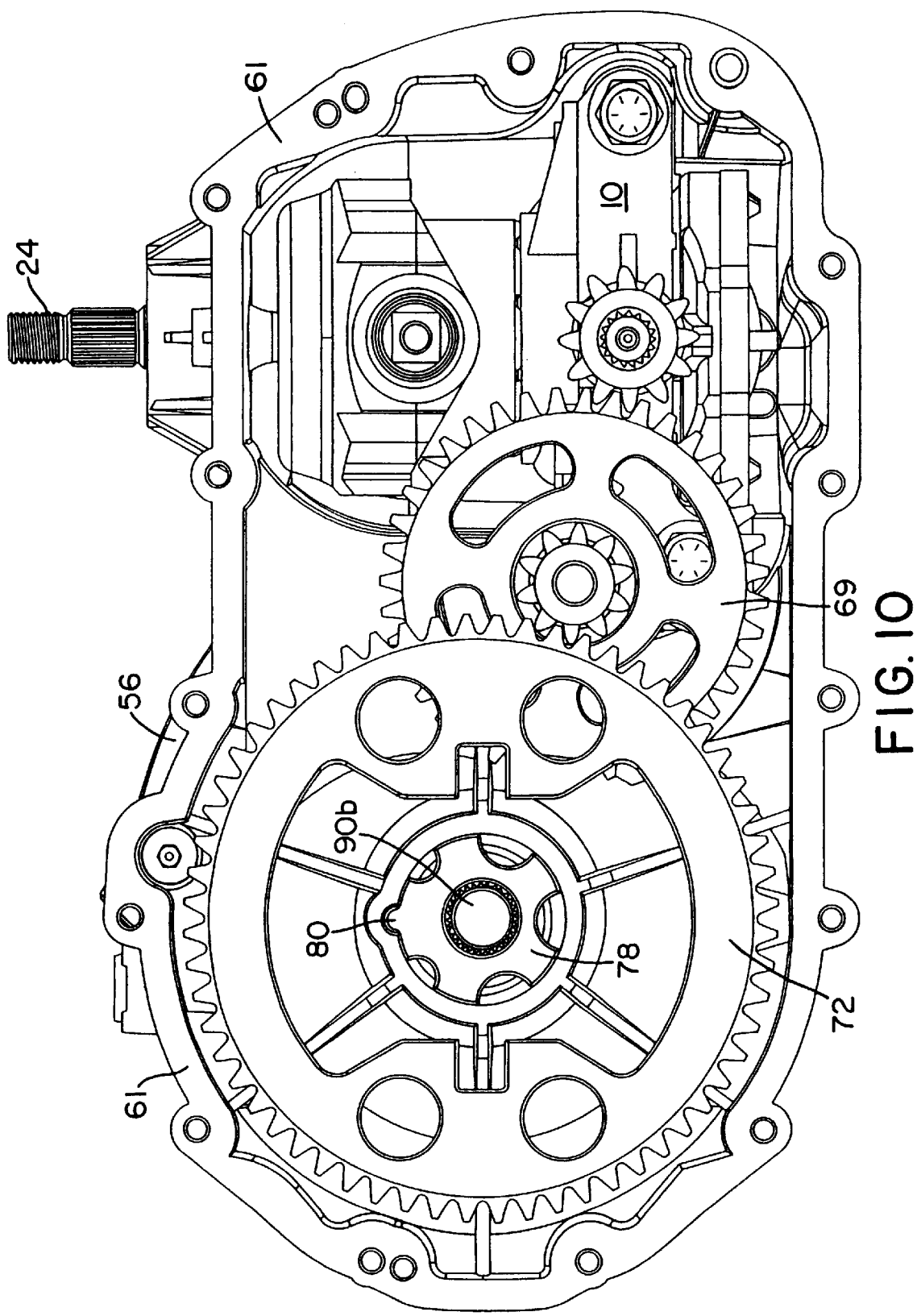

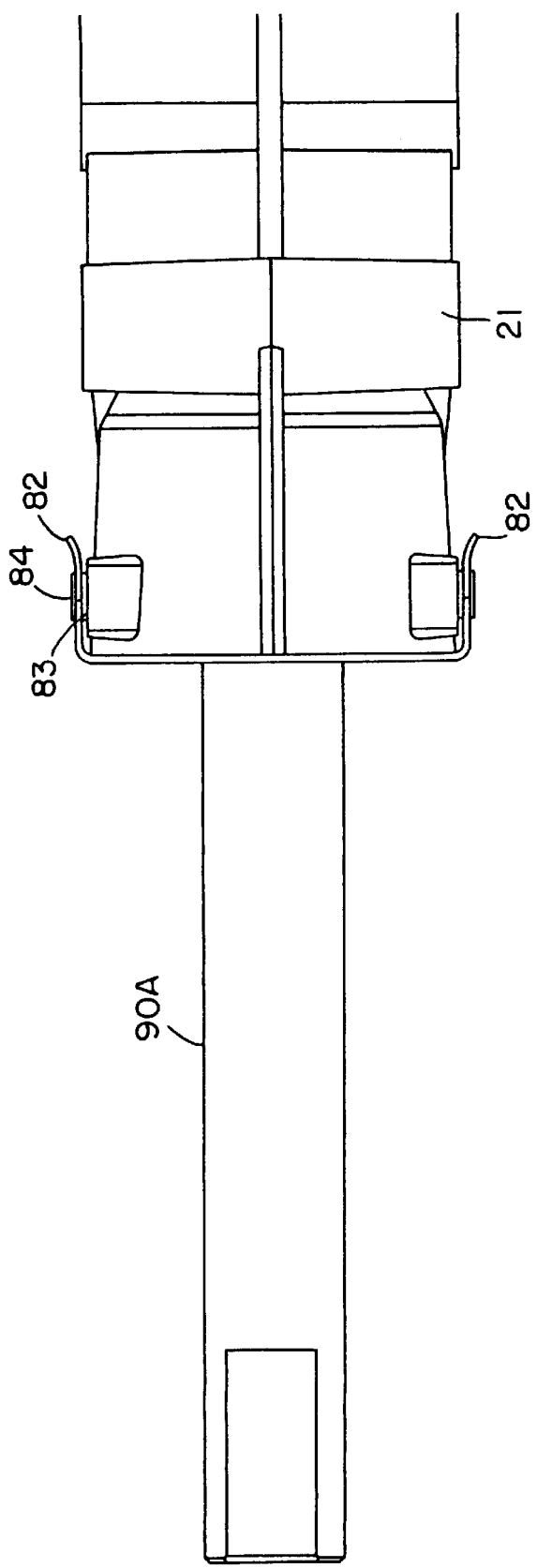

HOUSING AND CENTER SECTION FOR HYDROSTATIC TRANSMISSION

BACKGROUND

This invention relates to an improved design of a hydrostatic transmission ("HST") and includes several novel features. Hydrostatic transmissions are well known in the art, and are more fully described in, e.g., U.S. Pat. No. 5,314,387, which is incorporated herein in its entirety. Many of the inventions described herein can also be adapted for use in an integrated hydrostatic transmission ("IHT") incorporating output gearing and axles within a single housing.

In general, an HST has a hydraulic pump and a hydraulic motor mounted in a housing. The pump and motor are hydraulically linked through a generally closed circuit, and both consist of a rotatable body with pistons mounted therein. Hydraulic fluid such as oil is maintained in the closed circuit, and the HST generally has a sump or reservoir with which the closed circuit can exchange oil. This sump may be formed by the housing itself.

The pump is usually driven by an external motive source such as pulleys or belts connected to an internal combustion engine. The pump pistons engage a moveable swash plate and, as the pump is rotated by an input source driven by the external engine, the pistons engage the swash plate. Other HST designs may use a radial piston or ball piston pump and motor design, but the general operation is similar, and this invention is not limited to use with a specific design. Movement of the pump pistons creates movement of the hydraulic fluid from the pump to the motor, causing rotation thereof. The motor pistons are engaged against a fixed plate, and rotation of the motor drives an output shaft engaged thereto. This output shaft may be linked to mechanical gearing and output axles, which may be internal to the HST housing, as in an IHT, or external thereto.

The pump/motor system is fully reversible in a standard HST. As the swash plate against which the pump pistons move is moved, the rotational direction of the motor can be changed. In addition, there is a "neutral" position where the pump pistons are not moved in an axial direction, so that rotation of the pump does not create any movement of the hydraulic fluid. The HST closed circuit has two sides, namely a high pressure side in which oil is being pumped from the pump to the motor, and a low pressure or vacuum side, in which oil is being returned from the motor to the pump. When the swash plate angle is reversed, the flow out of the pump reverses so that the high pressure side of the circuit becomes the vacuum side and vice versa.

This hydraulic circuit can be formed as porting formed within the HST housing, or internal to a Q center section on which the pump and motor are rotatably mounted, or in other ways known in the art. Check valves are often used to draw hydraulic fluid into the low pressure side to make up for fluid lost due to leakage, for example. Such check valves may be located so that they directly contact the porting or they may be located separate from the porting and connected through additional bores to the closed circuit.

There is a need to have a means to open, or bypass, this closed circuit in certain circumstances. For example, when the vehicle is stopped, the oil in the closed circuit provides hydraulic braking, making it impossible to manually move the vehicle. Mechanical bypass designs are known in the art and are described in, for example, U.S. Pat. No. 5,010,733. Such designs generally achieve bypass by opening the closed hydraulic circuit to the sump by, e.g., opening check valves in the circuit, or by opening a shunt between the high pressure and low pressure sides of the circuit. Such designs are generally complicated and add significantly to the cost of the unit.

SUMMARY OF THE INVENTION

This housing design is a significant improvement over current transaxle designs. Using a traditional transaxle design, it is very difficult to achieve rear discharge, as the input shaft is near the vehicle centerline. Some designs have attempted to overcome this problem by mounting the transaxle on the same deck as the engine, and using connecting chains to another axle on which the tires are mounted. Such a design adds significantly to the overall cost of the unit.

One aspect of this invention is the use of a housing formed of two pieces, generally divided along a vertical axis with respect to the orientation of the output axles. One section of the housing or casing is much narrower than the other housing to maintain clearance between the body of the transmission and the vehicle frame on one side, in order to accommodate a rear discharge chute. Many of the HST elements internal to the housing are contained in the larger of the two casing portions. In addition, the external housing elements are designed to conform as closely as possible to the shape of the internal IHT elements, so as to minimize the amount of material needed and the overall size of the unit. In essence, this design allows the main housing component to be offset to one side of the vehicle, while still maintaining the input shaft at or near the vehicle center line. Thus, the discharge chute parallels the vehicle frame, rising up slightly to clear the axle horn.

A further object of the invention is to provide an HST having an improved swash plate mounted on at least one trunnion which is secured to the transmission casing, to offer lower control moments for the swash plate. This design offers improved control of the swash plate, which is particularly important for use of a foot control mechanism.

This invention also addresses the shortcomings in prior HST bypass designs, as an improved mechanical bypass system for a hydrostatic transmission is disclosed herein. One particular improvement of this design is in the tolerances allowed, as this design reduces or eliminates many of the tolerance issues which arise from known bypass designs. This invention uses a filter housing secured to the bottom of the center section indirectly by the check plugs, and a filter secured to the filter housing. The bypass actuator is mounted inside the filter housing and is actuated by means of a bypass rod which can extend outside the housing of the hydrostatic transmission to be operated by the user. Rotation of the rod causes the actuator to engage the check balls to unseat them from the check plug and allow the unit to enter the bypass mode. Other embodiments include use with an HST where the hydraulic porting is integrally formed with the transmission housing and the filter housing and filter are thus secured directly to the transmission housing.

A further object of this invention is to provide an improved and novel design of a center section for an HST, whereby the output shaft of the hydrostatic motor is secured at least partially by the center section and is positioned so that the axis of the output shaft is located below the plane of the surface on which the hydrostatic pump is mounted on the center section. The benefits of this arrangement include, among other things, a reduced height of the pump, motor and center section, which can reduce the overall height of the unit and/or provide more flexibility for mounting other HST elements. The horizontal mounting of the center section also allows for the use of the vertical split line as disclosed herein and the unique arrangement of the HST elements within the housing units.

A further object of this invention is to provide an improved and novel expansion chamber that can be bolted or otherwise secured to the HST and which prevents leakage or spillage of the hydraulic fluid therefrom. In a preferred embodiment this chamber is external to the housing and includes an internal tube extending from the top of the tank to the bottom, although variations on this design will be obvious to one of skill in the art. The use of an external tank allows for use of a smaller transmission housing, and reduces the possibilities of leakage due to gear splash and oil movement at various operating angles. The internal tube provides siphoning action which allows for, among other things, greater flexibility in the location of the tank.

A further feature disclosed herein in one embodiment is an improved design of a friction pack which enables the vehicle user to maintain the position of the pump swash plate, and thus the speed and direction of the vehicle. Friction packs have been known for years in connection with HITS and have been shown in, for example, U.S. Pat. No. 5,201,692. The improved design shown in the figures affords additional benefits that will be discussed herein.

A further embodiment of this invention provides a clip assembly secured to the ends of the axle horns to prevent excessive wear on the die cast transmission housing due to contact with the wheels. A pair of wheels are mounted at the ends of the axles and secured thereto by means of a retaining ring or other mechanism at the end of each axle. Many vehicle manufacturers will install washers on the axles between the wheels and the housing in order to space and locate the wheels. During operation of the vehicle, the wheels or the washers, as the case may be, can be forced into contact with the die cast aluminum housing, which can result in damage to the housing and oil seal. A clip composed of a material such as spring steel can be secured at the end of the housing to provide the necessary wear surface and prevent direct contact between the die cast housing and the wheels or washers.

There is also a need in the industry for being able to review a unit and readily determine information about the unit, such as its place and date of manufacture or similar information. At the present time, such information is generally placed on a unit by means of a label. This creates additional costs in both parts and assembly, and placement of a label on such a unit is made difficult by the obvious problem of oil present on the unit during the assembly process. The present invention in one embodiment solves this problem by use of a "information pad" comprising a series of protrusions on the external housing of the unit, which may be machined or left in the natural state, to create a variety of patterns. These patterns can be used as a code for any information the manufacturer may wish to include. The cost of machining for small external pieces is relatively small, and once the unit is so coded, the code will always be visible and accessible.

Other benefits and objects of this invention are disclosed herein and will be obvious to readers of ordinary skill in the art. The features disclosed herein can be combined to create a unique hydrostatic transmission design; it is understood, however, that such features are unique in their own right and can be used independently with other transmission designs, as will be obvious to one of ordinary skill in the art.

BRIEF DESCRIPTION OF THE DRAWINGS

FIG. 10-A is a side view of the transmission similar to that shown in FIG. 10, with a different embodiment of the differential.

FIG. 14-A is a sectional side view of the external expansion chamber as shown in FIG. 14, and also showing portions of the transmission housing.

FIG. 15 is a partial side view of a portion of a transmission and locking clip incorporating an embodiment of this invention.

FIG. 22-A is another side view of the external casing design.

DETAILED DESCRIPTION OF THE INVENTION

Figure 1:
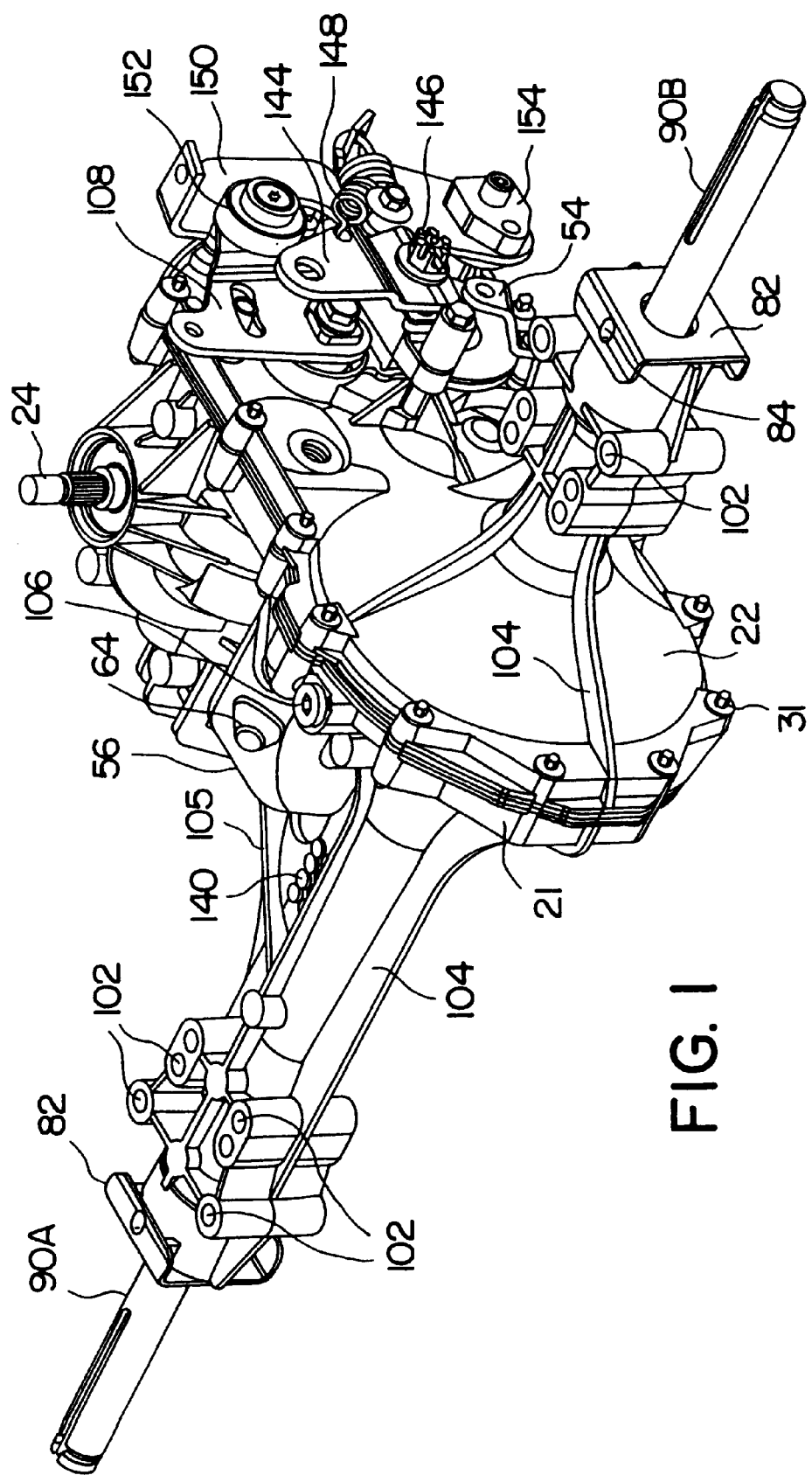
FIG. 1 is a perspective view of an external housing for an integrated hydrostatic transmission in accordance with the present invention.

The figures herein, and in particular, FIGS. 1, 3, 5,6 and 9 illustrate an IHT configured with a vertically split housing with main casing 21 and side casing 22. The arrangement of these housing elements are a key feature of the design, but certain embodiments of this invention do not require any specific housing configuration, and other housing configurations can be accommodated therewith. All specifics of an IHT are not shown in these figures, as the general operation of an IHT is known in the art. In general, where different embodiments of the various elements of the transmission are shown in different figures, like numerals designate like elements.

Pump 11 is disposed on center section 10 and receives input shaft 24, which communicates with and is driven by a vehicle engine (not shown). Center section 10 includes internal porting 25 that hydraulically connects pump 11 comprising pump cylinder block 17 and pump pistons 28 and a hydraulic motor comprising cylinder block 27 and motor pistons 32. Pump pistons 28 engage adjustable swash plate 23 to create pressure within internal porting 25. As shown in, e.g., FIGS. 3 and 8, pistons 28 generally include a spring 124 mounted therein and piston washer 125 placed in the top of piston 28 to prevent damage to the piston by spring 124.

Casings 21 and 22 form an internal sump or reservoir 43 external to center section 10. Motor cylinder block 27 is connected to and drives output shaft 66, which in turn drives various reduction gears, including gear 67, gear 69, gear 70 and differential 68 including bull gear 72. Differential 68 is in turn operatively connected to the output drive axles 90A and 90B of the vehicle.

Figure 2:
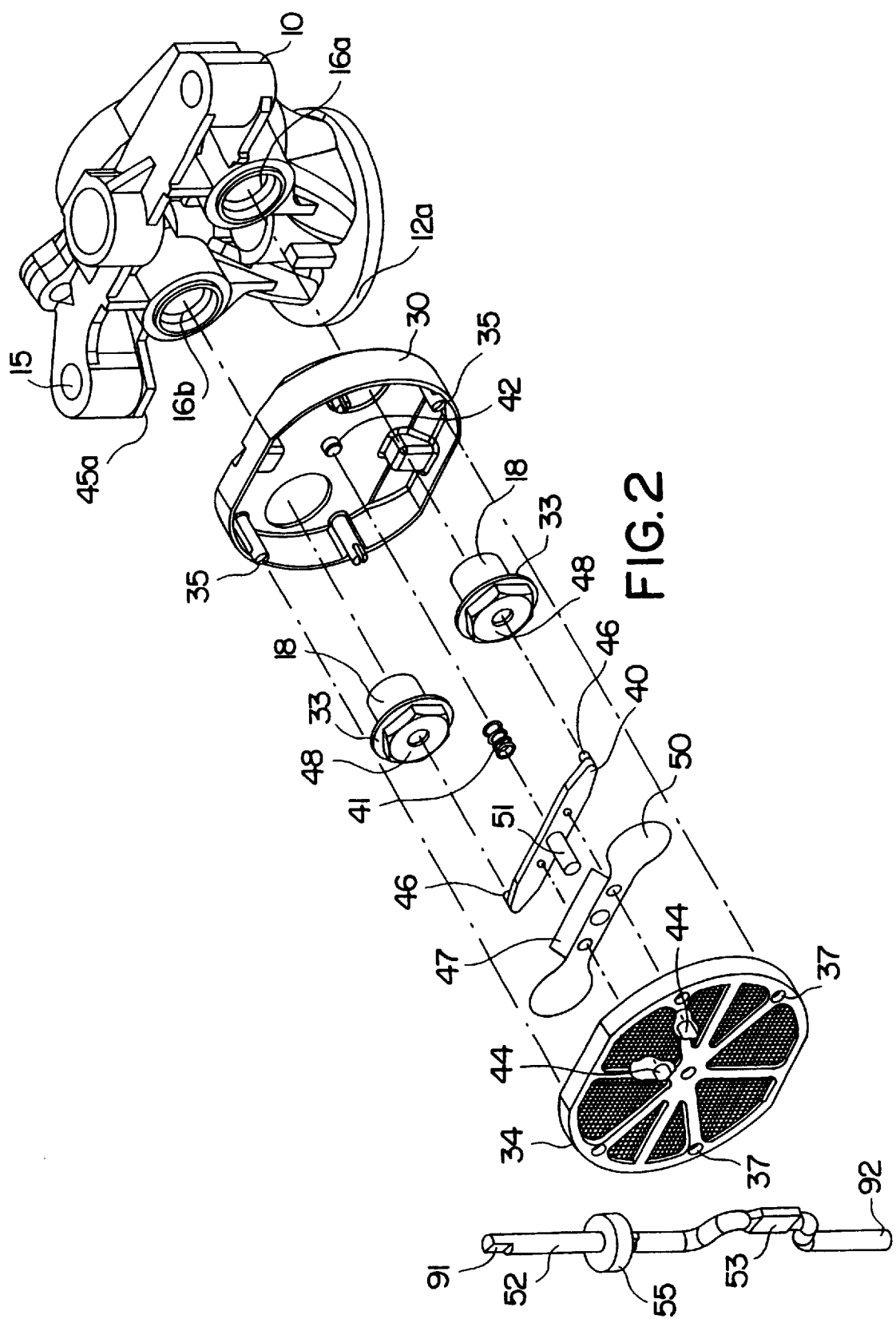
FIG. 2 is an exploded view of a center section and bypass mechanism in accordance with the present invention.
Figure 11:
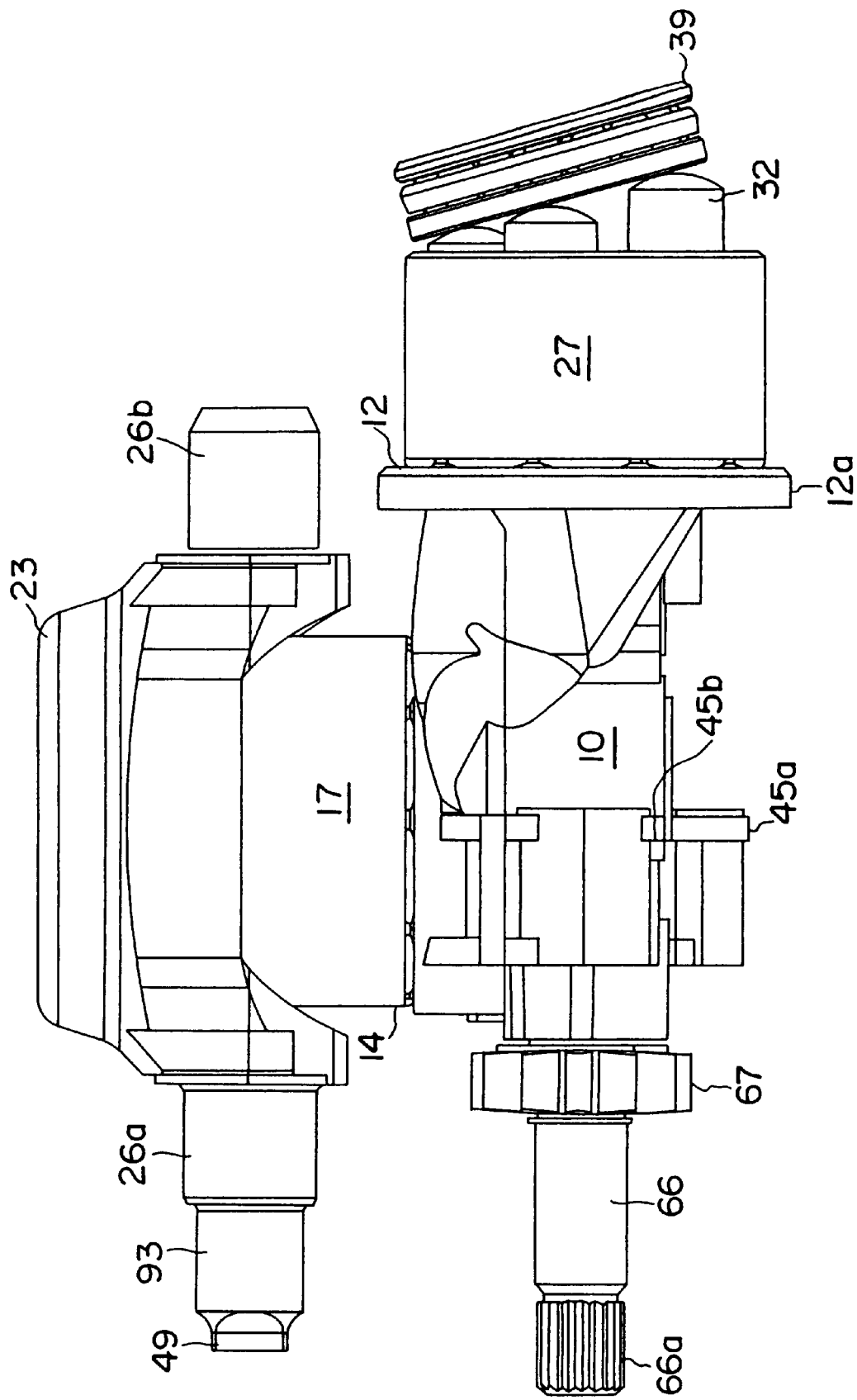
FIG. 11 is a side view of the center section hydrostatic pump and motor and swash plate of the subject invention.
Figure 17:
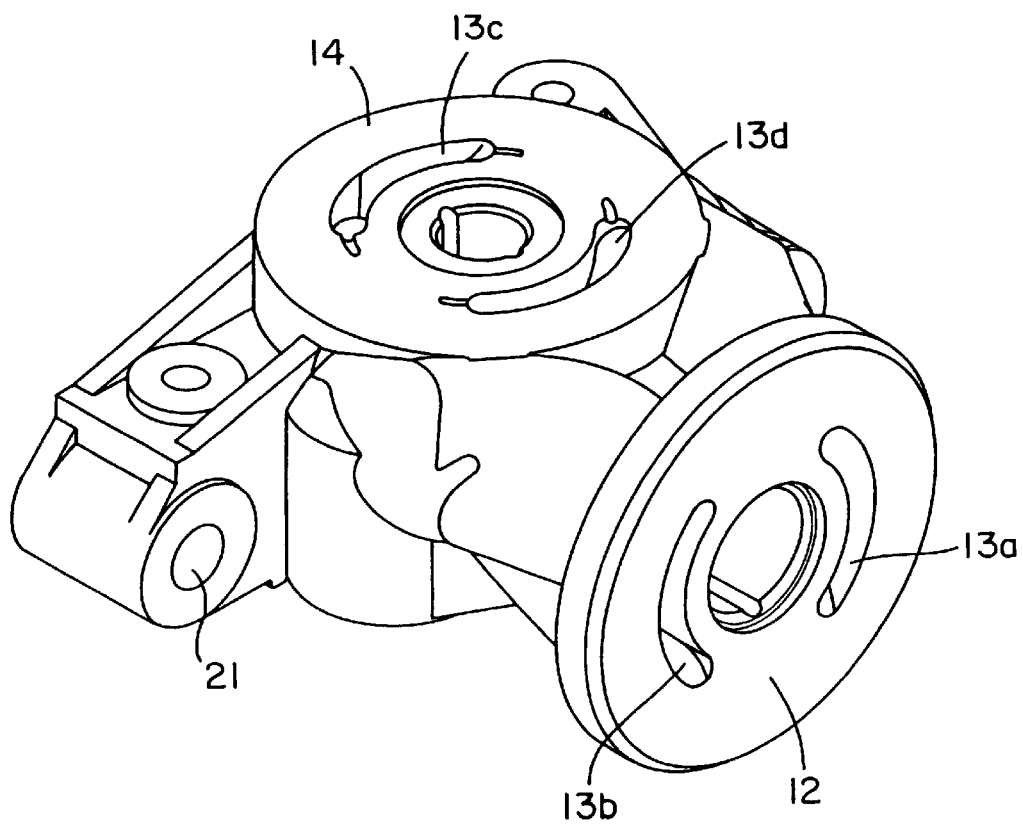
FIG. 17. is a perspective view of the center section.

As shown in FIGS. 2, 11 and 17, center section 10 has a motor running surface 12 and a pump running surface 14, on which motor cylinder block 27 and pump cylinder block 17 are respectively mounted for rotation. Center section 10 acts as, among other things, a mounting unit for the pump and motor of the hydrostatic transmission.

One goal of the invention is to minimize the effort required to manufacture such an HST, and to minimize the number of fasteners needed. Furthermore, the use of the horizontal connections between center section 10 and casing 21 allows for the vertical split configuration shown herein, with most of the HST elements being located in main casing section 21.

As shown in FIGS. 2 and 17 center section 10 can be secured to main casing 21 through bolt openings 15. Since these bolts are horizontal with respect to the HST as it is in use, the design uses stops 45a and 45b on center section 12 to contact main casing 21. Motor running surface 12 is formed as an integral part of center section 10 and includes sides 12a shaped so as to fit in a bore in main casing 21 in such a manner as to allow free communication of the hydraulic oil between the area surrounding the motor and the internal sump formed by the housing sections. The interaction of side 12a and stops 45a and 45b of center section 10 with main casing 21 supports the center section in the vertical direction and prevents rotation of center section 10 caused by torque in the system.

The hydraulic circuit is integrally formed as porting 25 in center section 10, although other alternative embodiments could be used. Such a hydraulic circuit generally has a high pressure side and a low pressure, or vacuum, side. Arcuate ports 13a and 13b are formed in motor running surface 12 and arcuate ports 13c and 13d are formed in pump running surface 14, and each such port corresponds to either the high pressure or low pressure sides of the hydraulic circuit. Check openings 16a and 16b are formed in center section 10 and are similarly correlated to the respective sides of the circuit. As shown most clearly in FIG. 4, check plugs 18 are threaded into the check openings 16, or may be fitted therein through other methods, and act to secure check balls 20. The operation of check plug systems is generally known in the art and is disclosed in U.S. Pat. No. 5,546,752, which is incorporated herein in its entirety. Check openings 16 are formed on what is generally referred to, for ease of reference, as the bottom of center section 10 although it is understood that the orientation is not so limited.

As shown in FIG. 2, a feature of this invention is the use of a separate filter housing 30, which is mounted adjacent to check plugs 18 at the bottom of center section 10. In the preferred embodiment, filter housing 30 is secured to the bottom of the center section 10 by washers 33 when check plugs 18 are screwed into openings 16, and O-rings 36 are used to assist in securing check plug 18 and to create a seal. Filter 34, which preferably is a 100 mesh filter, can be secured to filter housing 30 using flexible plastic snaps 35 which are integrally formed with filter housing 30. Snaps 35 then extend through corresponding openings 37 formed on filter 34. This allows filter 34 to be connected to housing 30 without the use of separate fasteners to minimize cost and assembly time. Other known methods of connecting filter 34 to housing 30, such as use of fasteners or tabs formed on filter 34, could also be used. It is also understood that the bypass mechanism disclosed herein is not specifically limited to the shape or design of the center section or check plug mechanisms 10. disclosed, but could also be easily used with other center section or check plug designs, or even with units which do not use a center section, but have the porting mounted elsewhere in the unit such as integrally formed with the housing.

Figure 3:
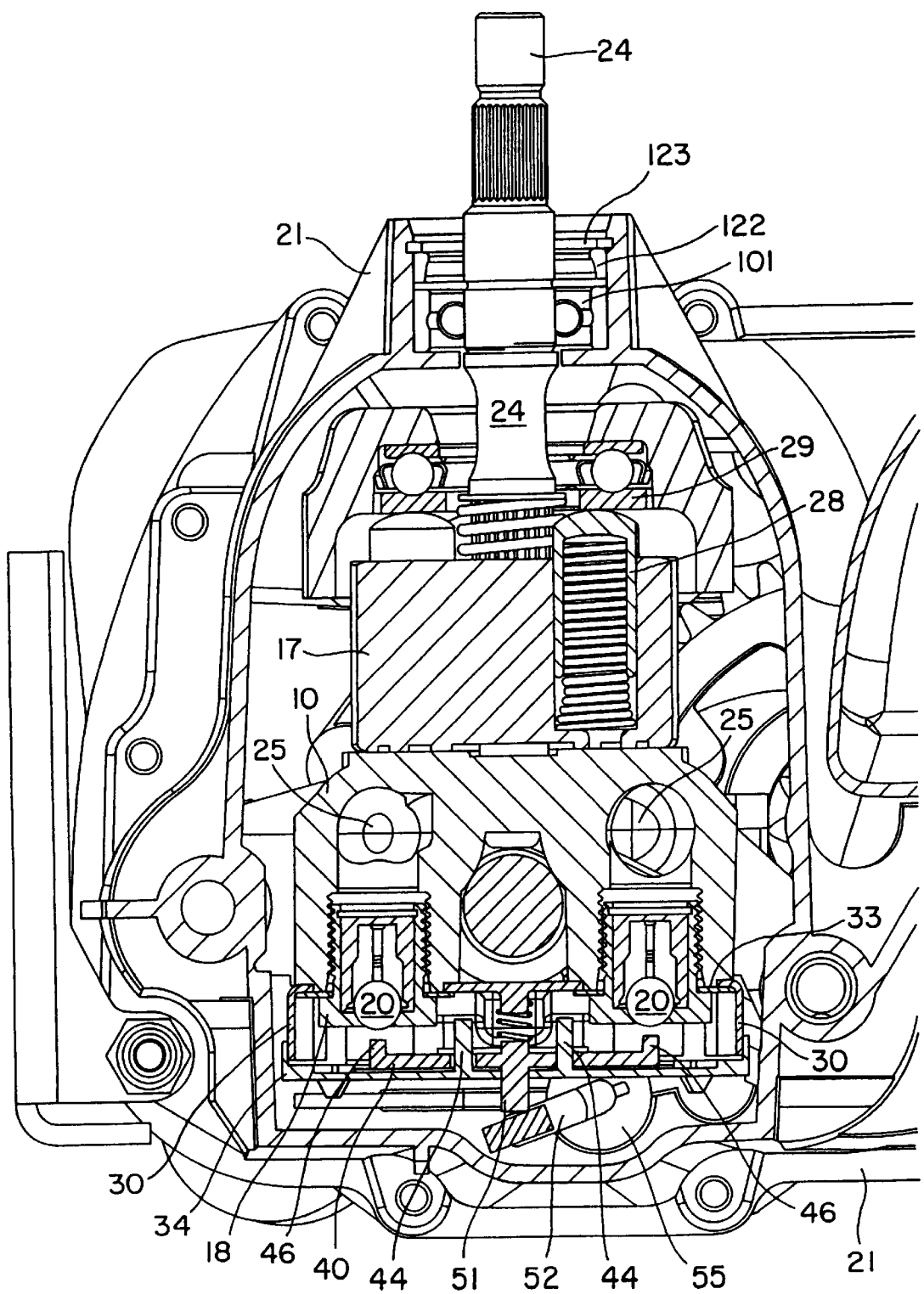
FIG. 3 is a sectional side view along the lines 3—3 in FIG. 5 showing a hydrostatic transmission incorporating a center section and bypass mechanism in accordance with the present invention, and showing a different embodiment of a torque bracket.
Figure 4:
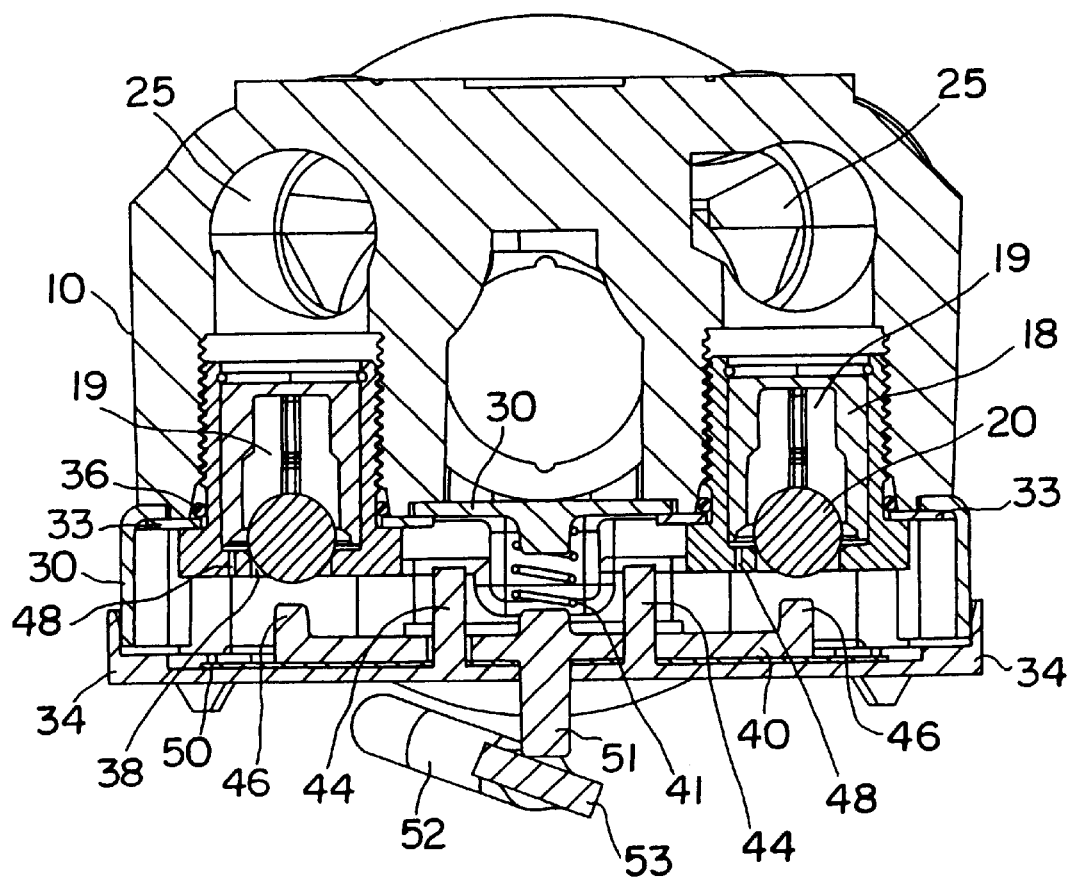
FIG. 4 is a detailed sectional view of the center section and bypass unit shown in FIG. 3.

As shown in FIGS. 3 and 4, check balls 20 are mounted in internal chambers 19 of check plugs 18. A seat is formed with openings 38 so that when a ball 20 is seated, no fluid can pass through opening 38. Bypass actuator 40 is mounted through use of spring 41 on tab 42 of filter housing 30, and use of guide pins 44 on filter 34. Projections 46 are formed with actuator 40 to contact balls 20 when actuator 40 is forced in that direction. Check plugs 18 may include bleeds 48 to allow discharge of fluid under high pressure. Bleeds are generally known in the art and provide a smoother transition when starting the vehicle or changing direction, e.g., from forward to reverse, and can also provide cooling for the hydraulic circuit.

In the preferred embodiment, shield 50 is secured through use of guide pins 44 and bypass actuator 40 and is positioned to block the high pressure flow of fluid from bleeds 48, in order to prevent the high pressure flow from contacting and damaging mesh filter 34. Flange 47 is formed on shield 50 for the purpose of providing additional bending strength to the member. Other methods of strengtening shield 50 could also be used. A shield mechanism could take different shapes and could also be integrally formed as part of actuator 40 and/or projections 46.

Actuation tab 51 is formed on actuator 40 and extends through an opening in filter 34 to contact paddle 53 of bypass actuator rod 52, which acts as a cam. Spring 41 acts to hold actuator 40 and projections 46 in the "disengaged" position shown most clearly in FIG. 4. When rod 52 is rotated, paddle 53 engages tab 51 and forces actuator 50 away from filter 34 and in a direction towards check balls 20, overcoming the bias force of spring 41. In this fully engaged position, projections 46 engage check balls 20 to push them off the seats and into internal chamber 19 to allow discharge of fluid from check plugs 18, thus placing the unit in bypass.

Figure 6:
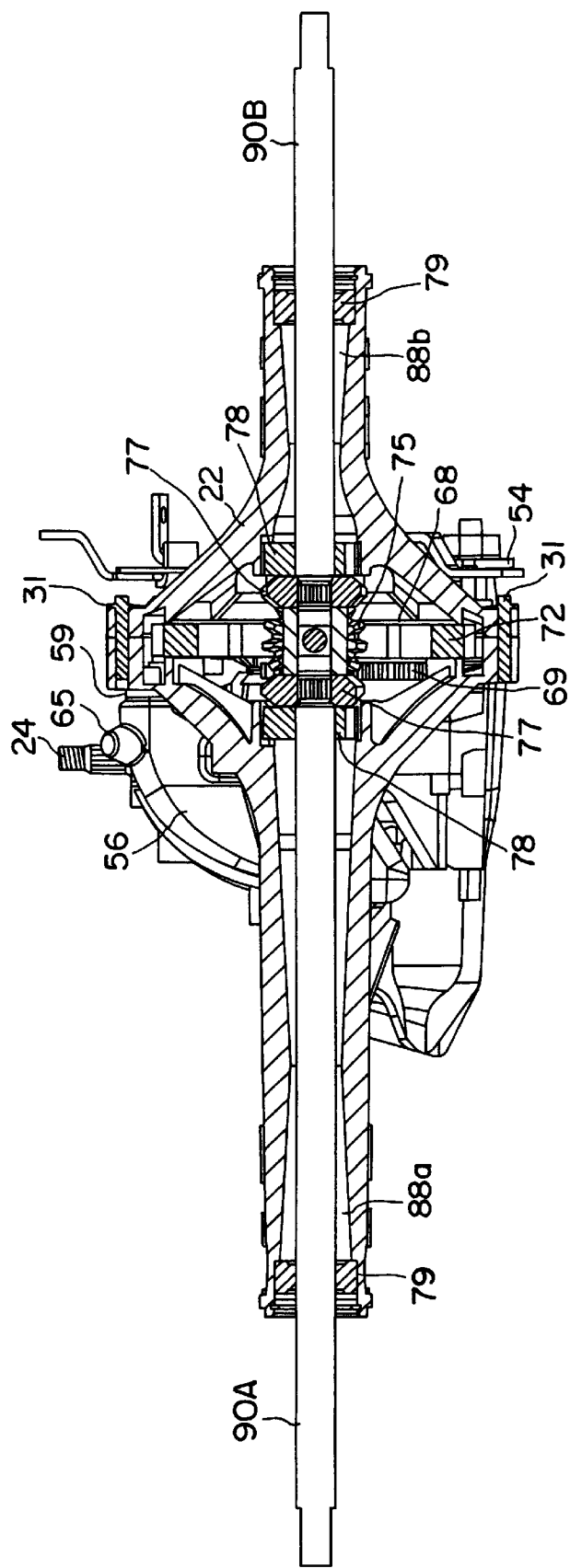
FIG. 6 is a cross-sectional side view of a transmission in accordance with one embodiment of the present invention, along the lines 6—6 in FIG. 5.
Figure 7:
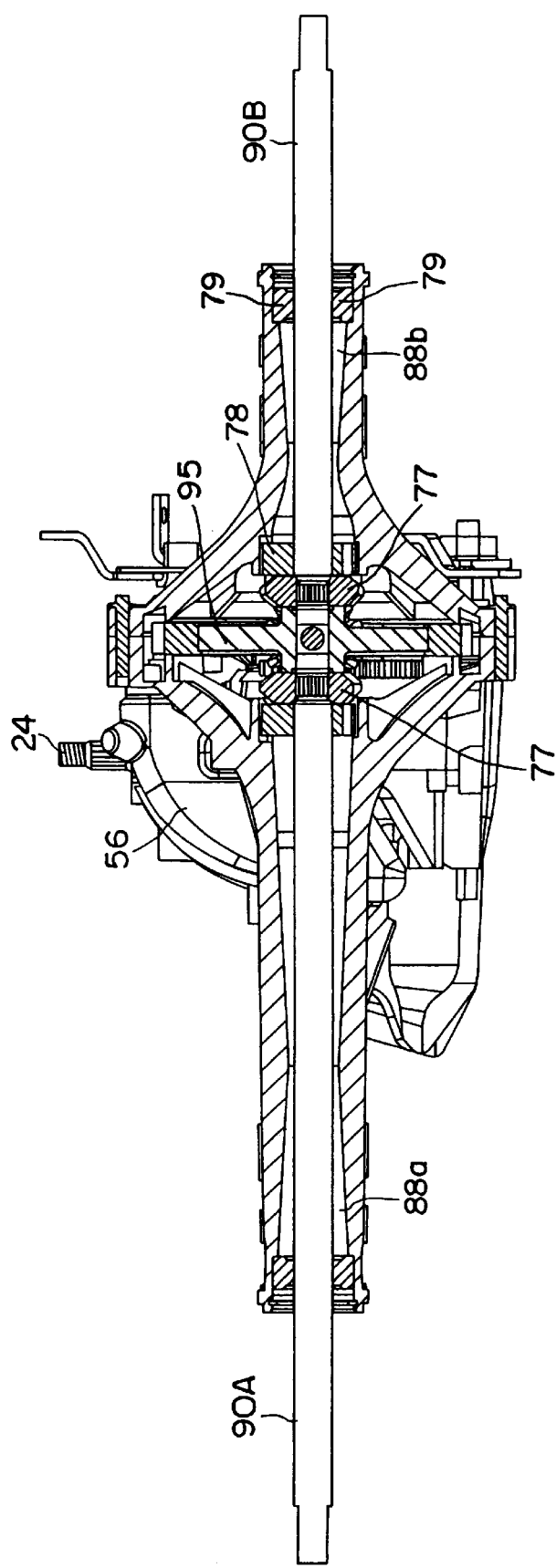
FIG. 7 is the same cross-sectional side view of a transmission as shown in FIG. 6, in accordance with another embodiment of the present invention, showing the differential block as shown in FIG. 9.
Figure 8:
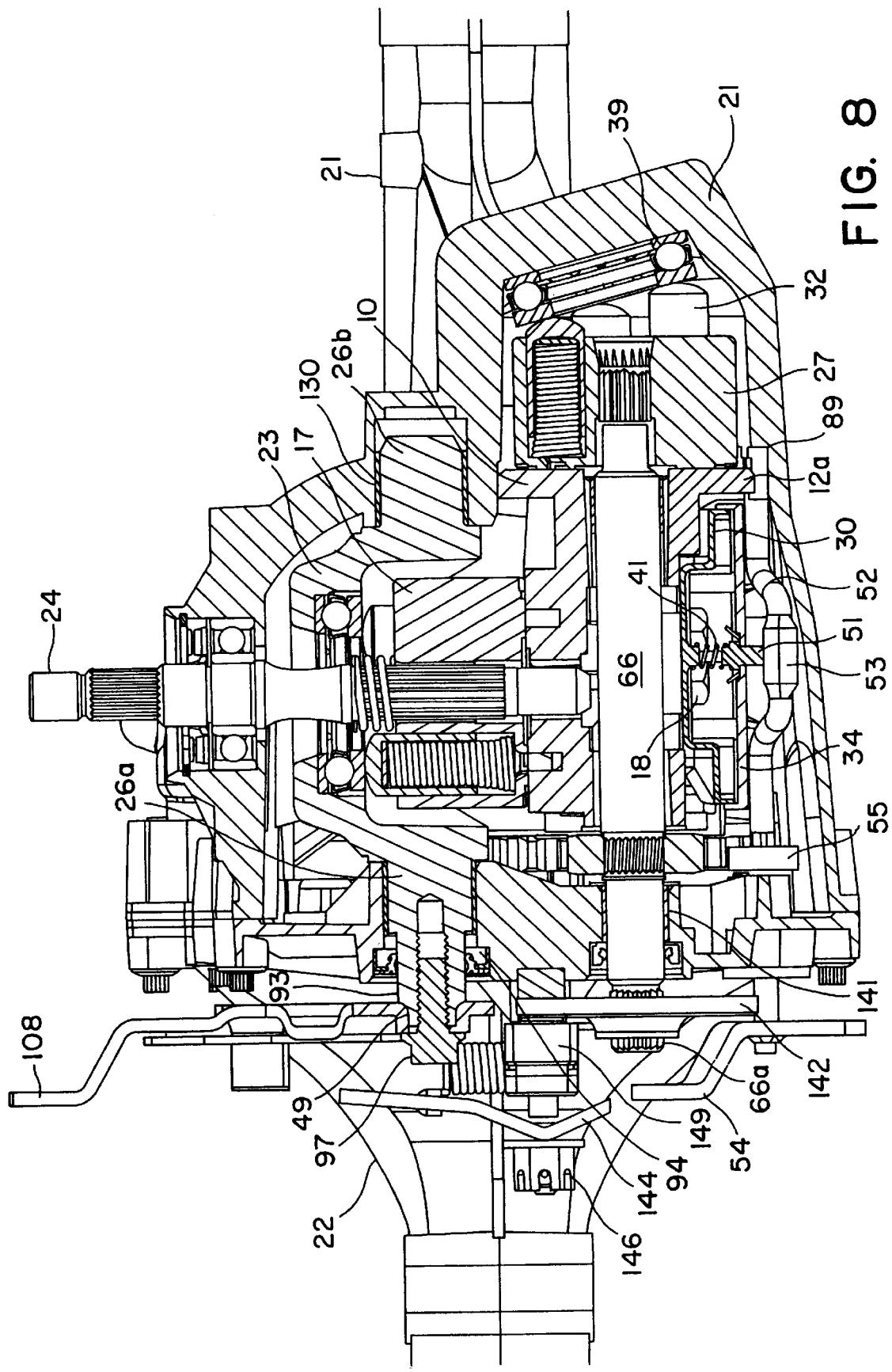
FIG. 8 is a side sectional view along the lines 8—8 of FIG. 5.
Figure 9:
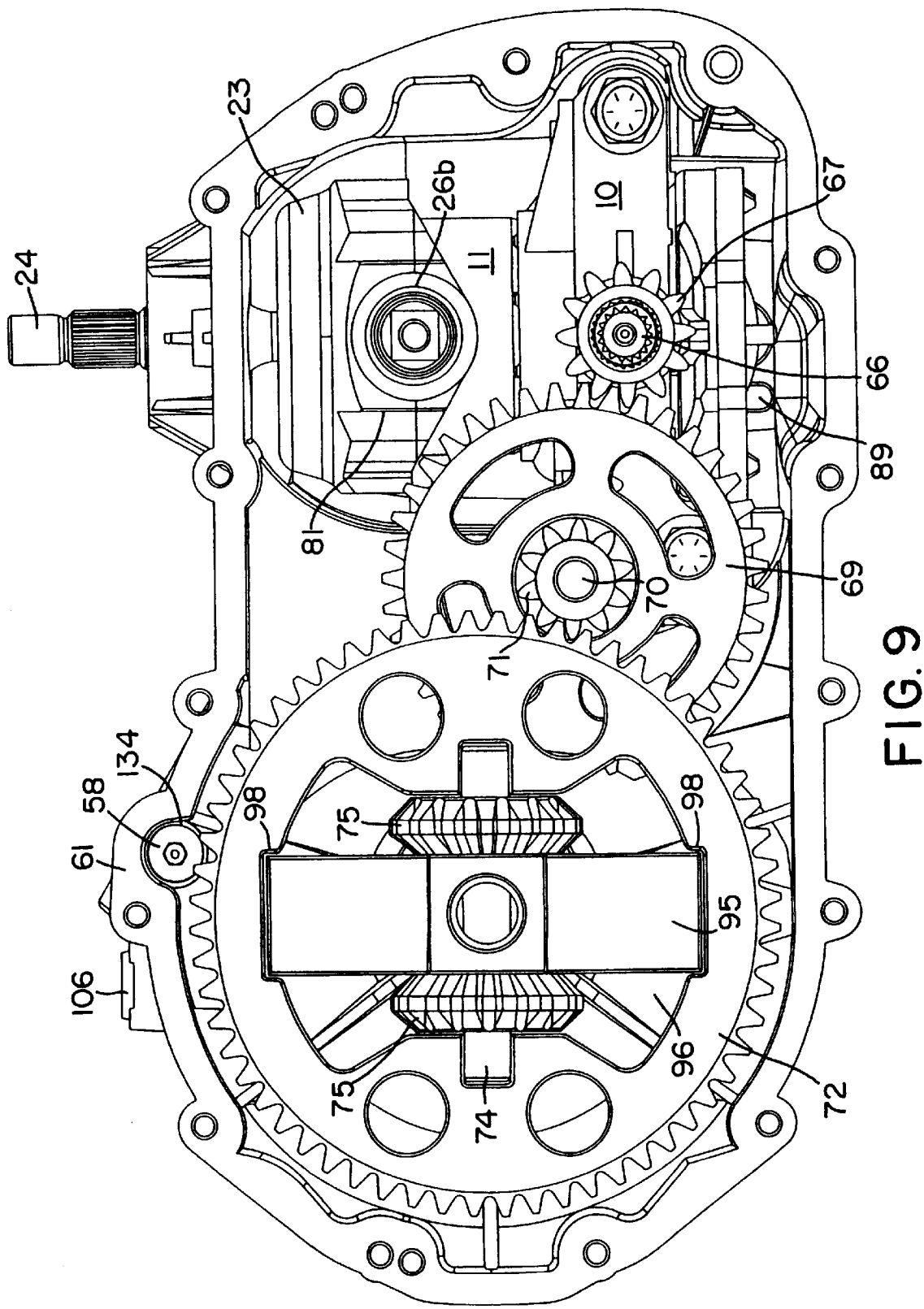
FIG. 9 is a side view of the transmission with one portion of the casing removed.

Rotation of rod 52 back to its original position will take paddle 53 off of tab 51, and the bias force of spring 41 will force actuator 40 off balls 20 to take the unit out of the bypass mode. Bypass rod 52 is rotated by means of an external arm 54, as shown in FIGS. 6, 8 and 9 or it may be activated by other methods as known in the art. External arm 54 contacts tapered flat 91 formed on rod 52 and may be secured by means of a push-on nut. End 92 of rod 52 may rest in the housing or could be otherwise secured for rotation. End 92 of bypass rod 52 can rest in a slot 89 formed in main casing 21, as shown most clearly in FIG. 9, where the other elements of the bypass have been removed, in order to facilitate ease of manufacture. As shown in FIG. 8, rod 52 is held in slot 89 by the lower side surface 12a of motor running surface 12. As an alternative embodiment, the diameter of motor running surface 12 could be increased, and the rear side of surface 12 could have a bore formed in it or otherwise have an opening created to hold end 92 of rod 52.

Other methods of actuating the bypass could also be used, such as a member extending directly through the bottom of casing 21, which could directly engage tab 51. Magnet 55 can optionally be secured on rod 52 by means of a tab, for example. This magnet functions as a washer to assist in maintaining rod 52 in the housing, while also acting to filter loose metal parts from the hydraulic fluid. It is understood that such a bypass design could be used with a variety of hydrostatic transmission designs.

Figure 21:
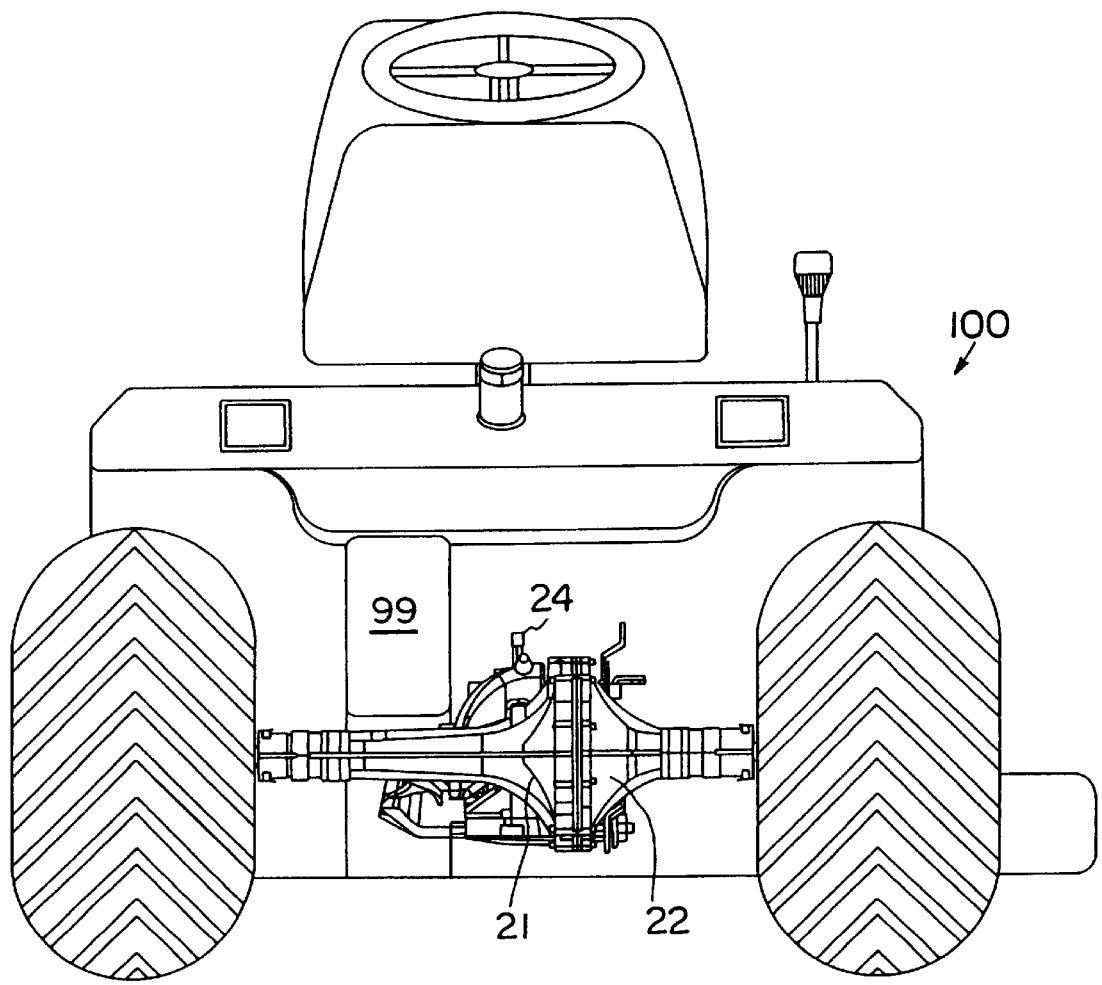
FIG. 21 is a rear view of a tractor using a transmission in accordance with one embodiment of the present invention.

As shown in FIGS. 1, 3, 5 and 6, the transmission housing includes main casing 21 and side casing 22, which are secured by bolts 31 along a vertical flange 61 defining a split line. The benefit of this arrangement is shown most clearly in FIG. 21, where the arrangement of main casing 21 and side casing 22 allows for a central location of input shaft 24 so that it can engage the driving linkage (not shown) without any modification of the tractor design, while still allowing use of a rear discharge chute 99.

Input shaft 24 is powered by an external motive force (not shown) to power hydrostatic pump 11. Input shaft 24 extends through an opening formed in casing 21, and is supported therein by ball bearing 101. Seal 122 and retaining ring 123 act to prevent leakage. Shaft 24 also extends through swash plate 23 and swash plate thrust bearing 29.

As shown in FIG. 9, motor shaft 66 is drivingly engaged to gear 67, which in turn is engaged to gear 69. Gears 67 and 69 are mounted entirely within main casing 21. Gear 71 is rotatably mounted on intermediate (or jack) shaft 70. Gear 69 includes gear teeth on its internal diameter sized to correspond with the teeth of gear 71, such that gear 71 fits inside and drives gear 69. Gear 71 is also engaged to differential bull (or spur) gear 72. A cross shaft 74 is mounted in bull gear 72 and has a pair of planet bevel gears 75 mounted thereon. Gear 71 and bull gear 72 are mounted such that the plane of flange 61, i.e. the parting line between the two housing casings 21 and 22, passes therethrough. As shown in FIG. 6, axle bevel gears 77 are engaged to axles 90A and B and to the differential.

One of the benefits of the current design is that it provides a significantly smaller external housing for an HST than is generally provided by the prior art designs. As shown most clearly in FIGS. 1, 5 and 8, the external housing is shaped to conform to the shape of the internal IHT components. This minimizes the amount of material needed, which reduces cost and weight. Such a design does present potential concerns for strength due to the smaller amount of material used. Therefore, a plurality of support ribs 104, including flying rib 105, are formed on the external surfaces of casings 21 and 22 to provide additional support for the housing.

Figure 23:
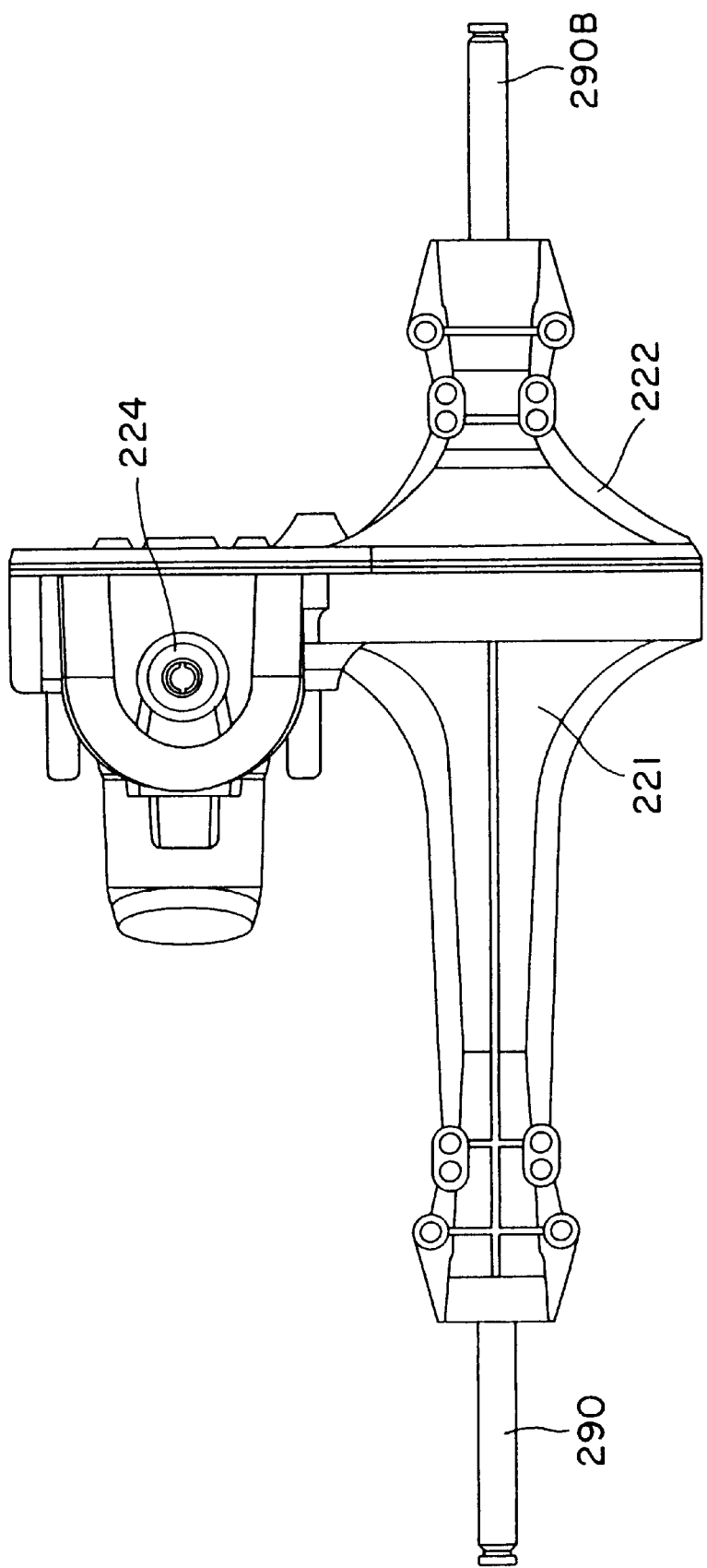
FIG. 23 is a top view of an alternative embodiment of the external housing for a hydrostatic transmission, without the external controls.

As another embodiment, the housing could be constructed without the flying ribs as shown in FIG. 23, where main casing 221 and side casing 222 are formed without the ribs, and axles 290A and 290B extend from the casings 221 and 222. The internal configuration of such a unit could be substantially the same as that shown in other embodiments herein, and input shaft 224 could be used to drive a pump in the manner described above. In such an embodiment the die cast aluminum of the housing would necessarily be enhanced in certain areas to increase the strength of the unit. This embodiment would improve the cooling of the unit, as air flow is maximized over the primary heat generating surfaces.

Figure 24:
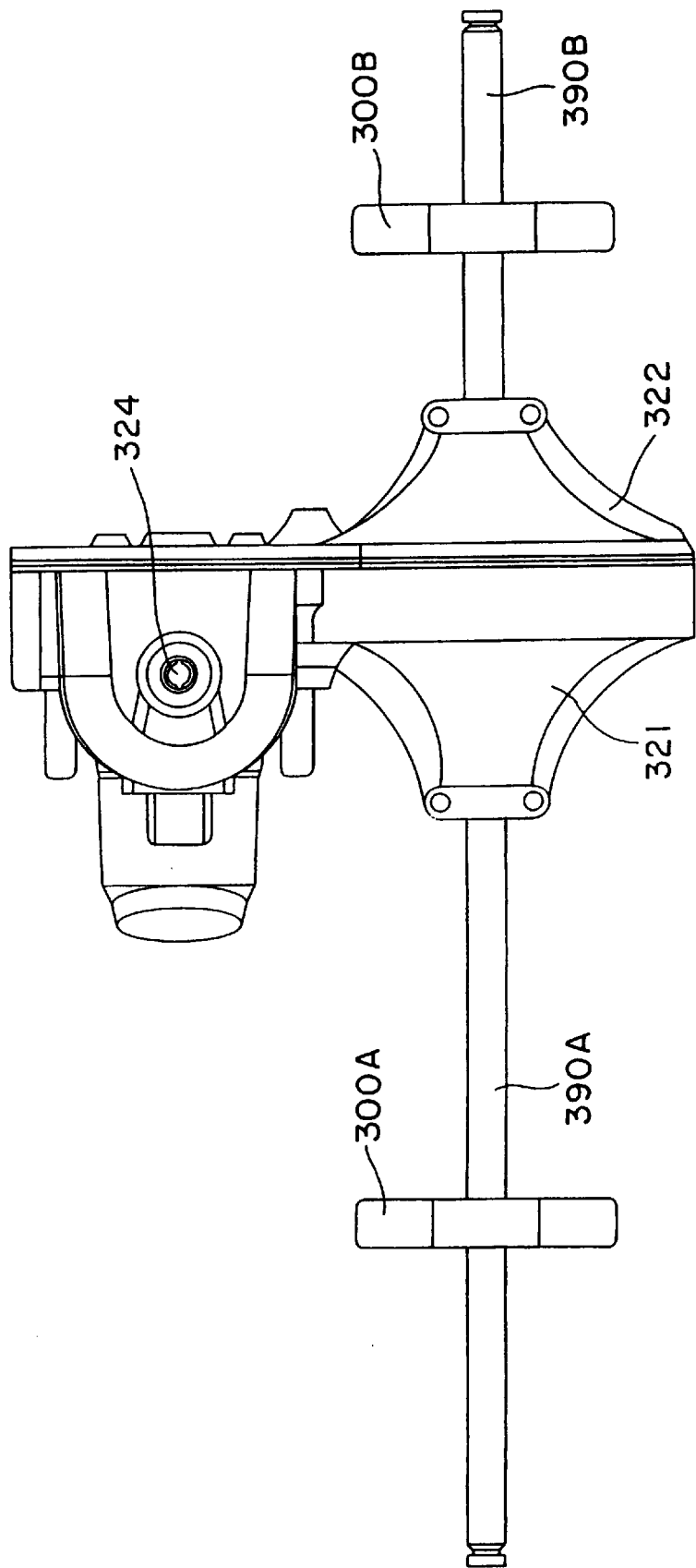
FIG. 24 is a top view of another alternative embodiment of the external housing for a hydrostatic transmission, without the external controls.

A further embodiment is shown in FIG. 24, where the housing consisting of main casing 321 and side casing 322 have been further reduced in size, so that axles 390A and 390B are rotatably supported therein but significant portions of said axles extend outside of the casings and are supported at the ends thereof by bearing pillow blocks 300A and 300B. The bearing pillow blocks 300A and 300B would then be mounted to the frame of the vehicle.

Figure 10A:
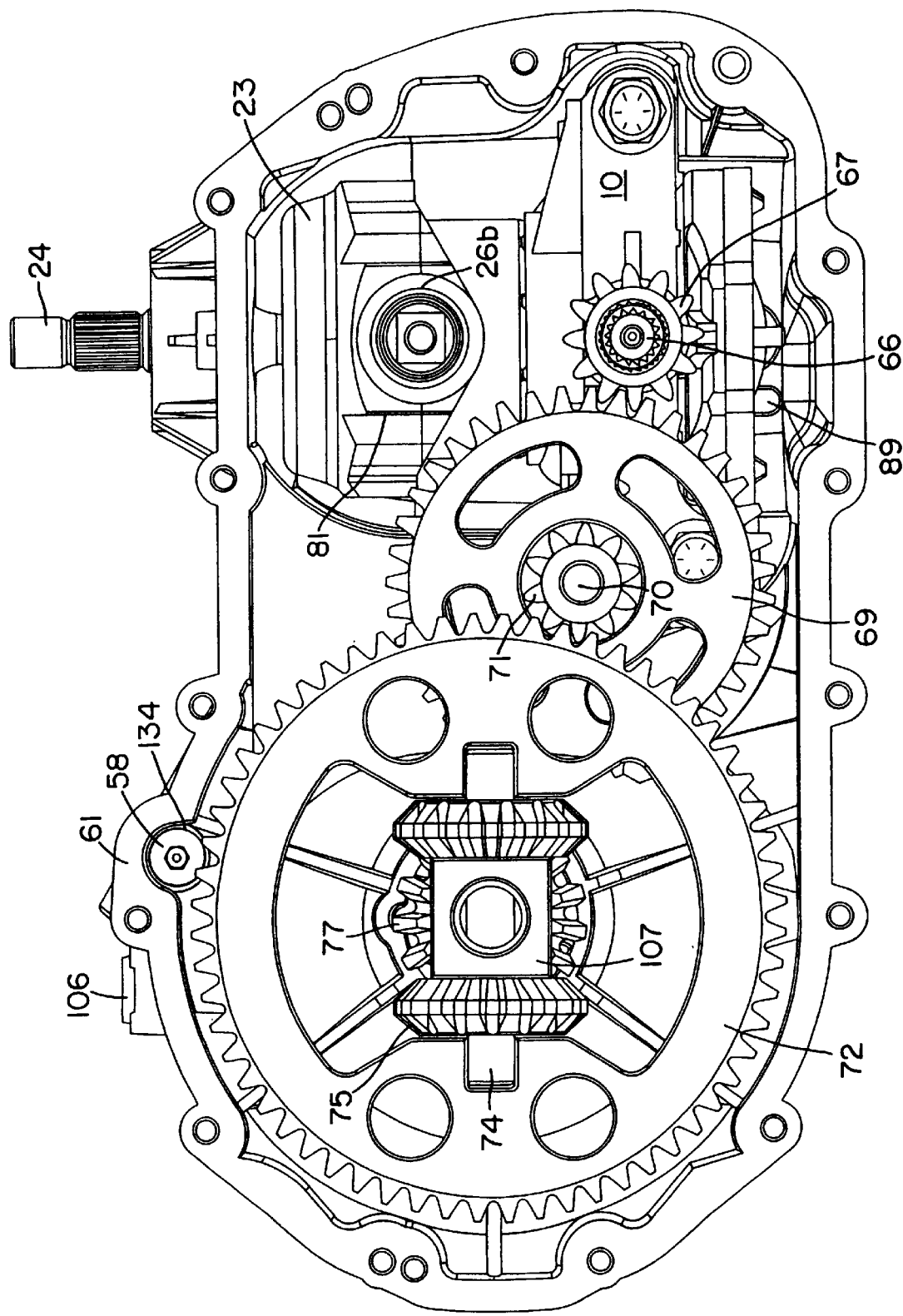
FIG. 10 is a side view of the transmission, with one portion of the casing and the bevel gears of the differential removed.

Axles 90A and 90B extend from their respective housings. As shown in FIG. 10, which shows the differential with the bevel gears removed, lobed bearings 78 act to secure bevel gears 77 and axles 90A and 90B, while solid bearings 79 provide support at the ends of the axles. The use of lobed bearings 78 allows transfer of hydraulic oil from the main casing to the internal chambers 88a and 88b of the axle horns, and the bearings include a clocking mechanism 80 to prevent rotation of the bearings 78 and the wear inherent in such rotation.

Figure 18:
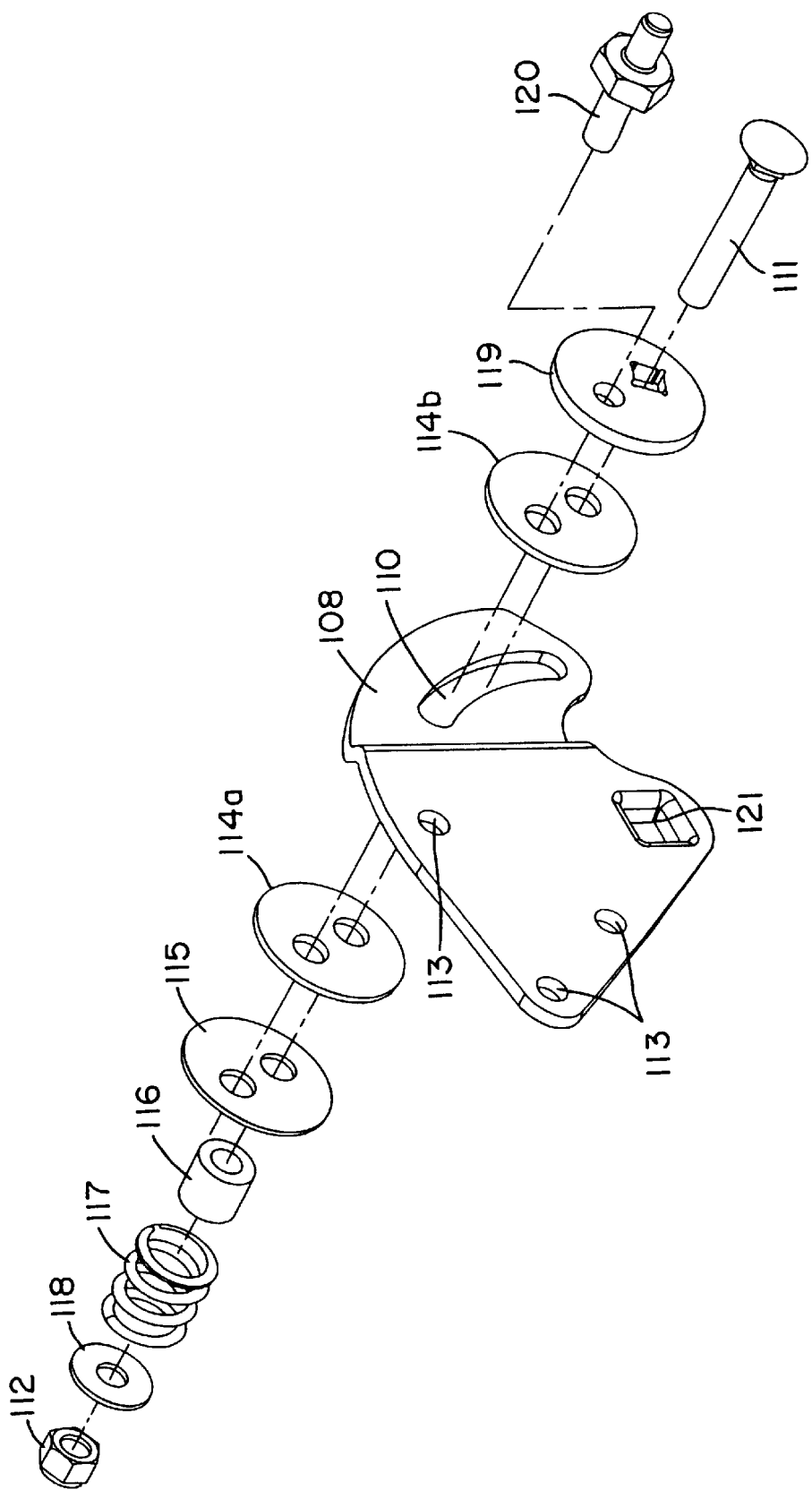
FIG. 18 is an expanded view of the floating friction pack in accordance with one embodiment of this invention.
Figure 19:
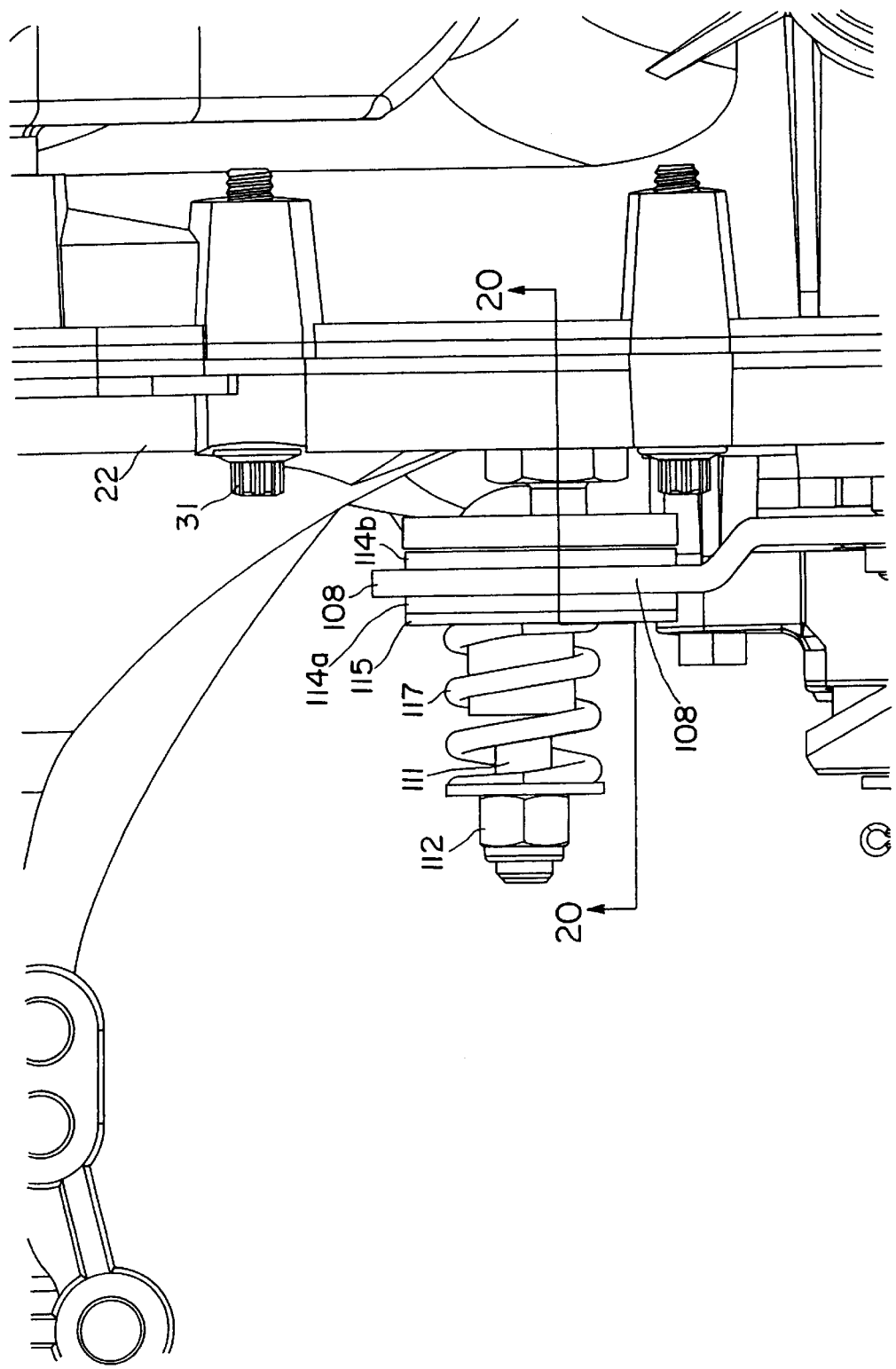
FIG. 19 is a view of the floating friction pack of FIG. 18 mounted on the transmission housing.
Figure 20:
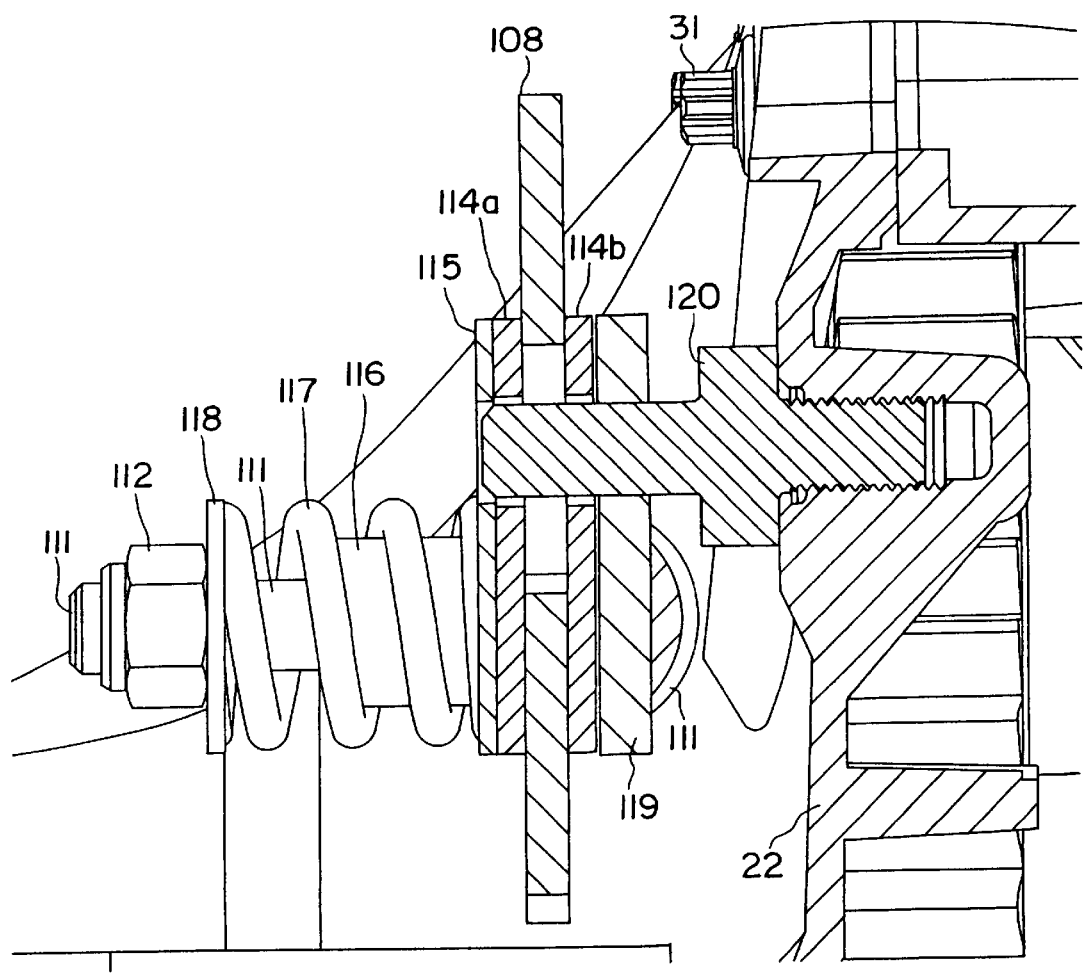
FIG. 20 is a partial sectional view of the floating friction pack as shown in FIG. 19.

As shown in FIGS. 3, 9 and 11, pump 11 is rotatably mounted on center section 10. Hydrostatic transmissions in the past have generally used cradle mounted swash plates mounted directly on the housing. In the preferred embodiment of the present invention, the speed and direction of the hydrostatic transmission may be changed by use of moveable swash plate 23, which is mounted on trunnions 26a and 26b secured to casings 22 and 21, respectively. As shown also in FIGS. 8 and 18, trunnion 26a includes a step 93 to act as an oil seal surface with trunnion seal 94 of casing 22, and flats 49 extend outside casing 22 to engage control arm 108.

Bolt 97 extends through opening 121 formed in control arm 108 and is threaded or otherwise secured directly into trunnion 26a. Opening 121 preferably has flat sides with a radius formed to improve stability of control arm 108. In the preferred embodiment, friction bearings 130 interface between main casing 21 and trunnions 26a and 26b. It is understood that trunnions 26a and/or 26b could also run directly on the housing elements without the need for a friction bearing.

Center section 10, pump cylinder block 17 and motor cylinder block 27 are mounted completely within the main casing 21. Swash plate 23 crosses the parting line 61 of main casing 21 and side casing 22, with the portion of the swash plate 23 that supports the pump block 11 within the main casing 21, and trunnion 26 of swash plate 23 extends across the parting line or flange 61 to interface with side casing 22. Swash plate 23 is supported by main casing 21 at one end, and by side casing 22 at the other end.

As shown in FIGS. 3 and 11, pump cylinder block 17 includes a plurality of pump pistons 28, which engage thrust bearing 29 mounted inside swash plate 23. Motor cylinder block 27 houses motor pistons 32, which engage a fixed angle thrust bearing 39 secured in main casing 21.

Figure 12:
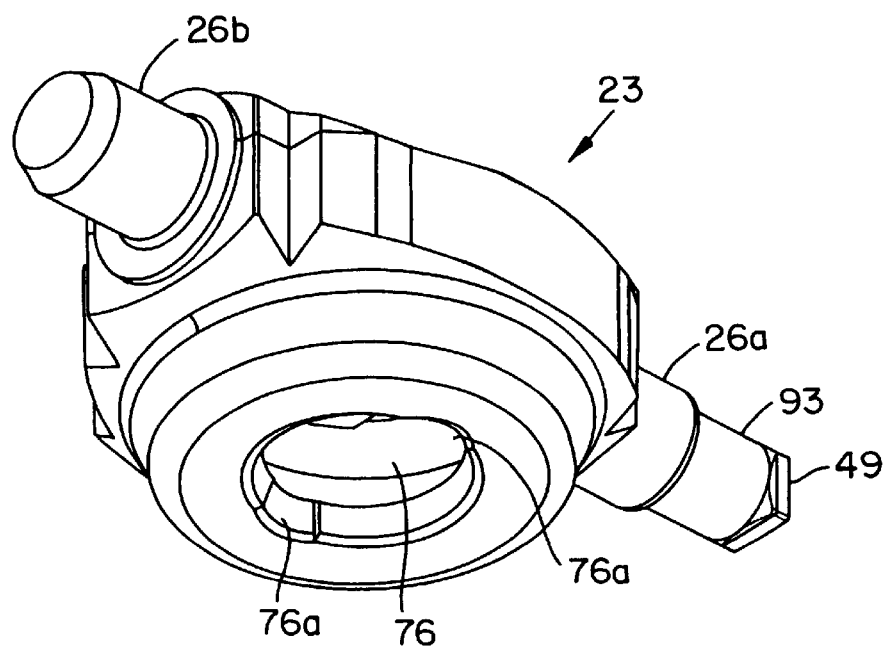
FIG. 12 is a perspective view of the swash plate of the subject invention.
Figure 13:
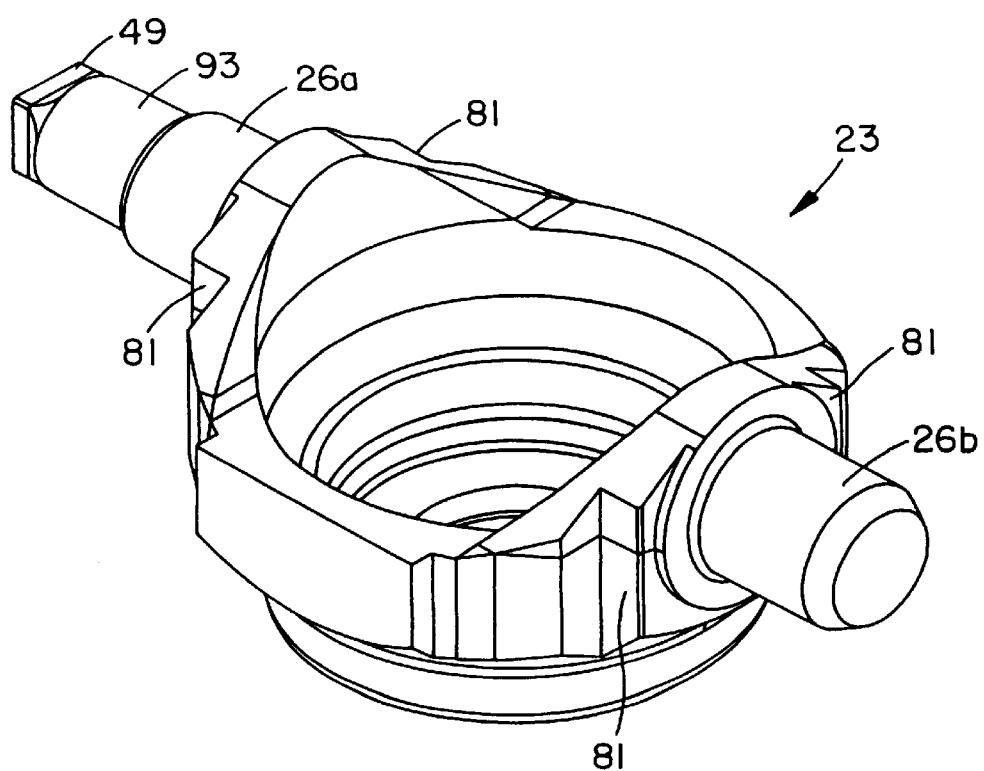
FIG. 13 is another perspective view of the swash plate of the subject invention.

Swash plate 23 includes opening 76 formed therein for input shaft 24 to extend therethrough. As shown most clearly in FIG. 12, opening 76 includes a plurality of notches 76a formed therein to provide necessary clearance for input shaft 24. Swash plate also is shaped to include a plurality of notches 81, which can be used for clamping swash plate 23 during machining thereof. The location of notches 81 provides the optimal clamping location to avoid flexing the material during machining. A further benefit of notches 81, and particularly the notches adjacent to trunnion 26a is to provide additional clearance inside the housing. As shown in, for example, FIG. 9, the location of notch 81 avoids contact of swash plate 23 with gear 69 during certain swash orientations.

Motor shaft 66 also crosses the parting line of main casing 21 and side casing 22. One end of motor shaft 66 is supported by center section 10, and the other end is supported by and extends out of side casing 22, and includes a spline 66a for mounting to a conventional brake mechanism. Motor shaft 66 is mounted below the running surface 14 of center section 10 and parallel thereto, to reduce the height of these hydrostatic components.

Figure 22:
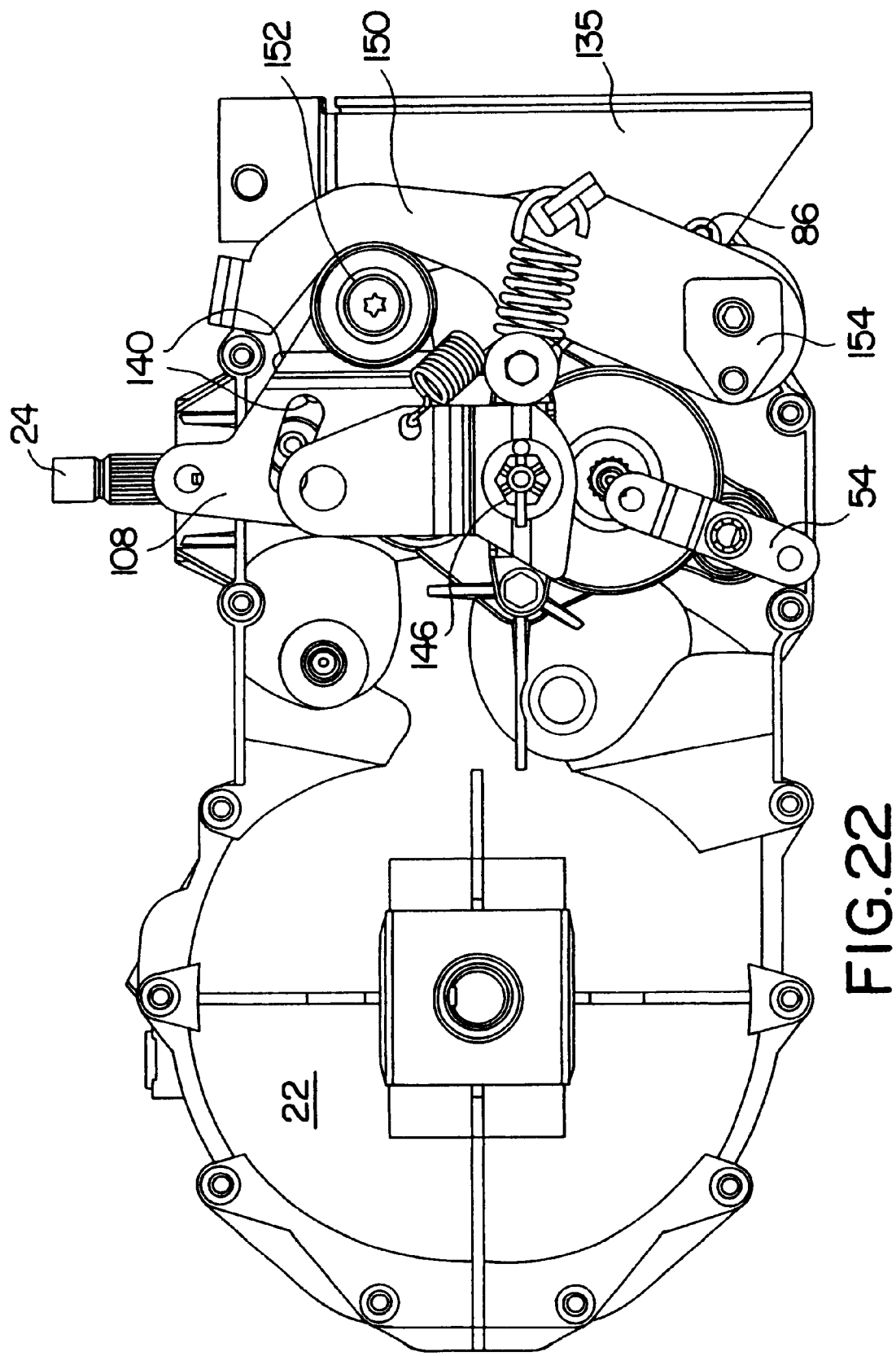
FIG. 22 is a side view of the external housing, showing a second embodiment of the return to neutral feature of the present invention.
Figure 22A:
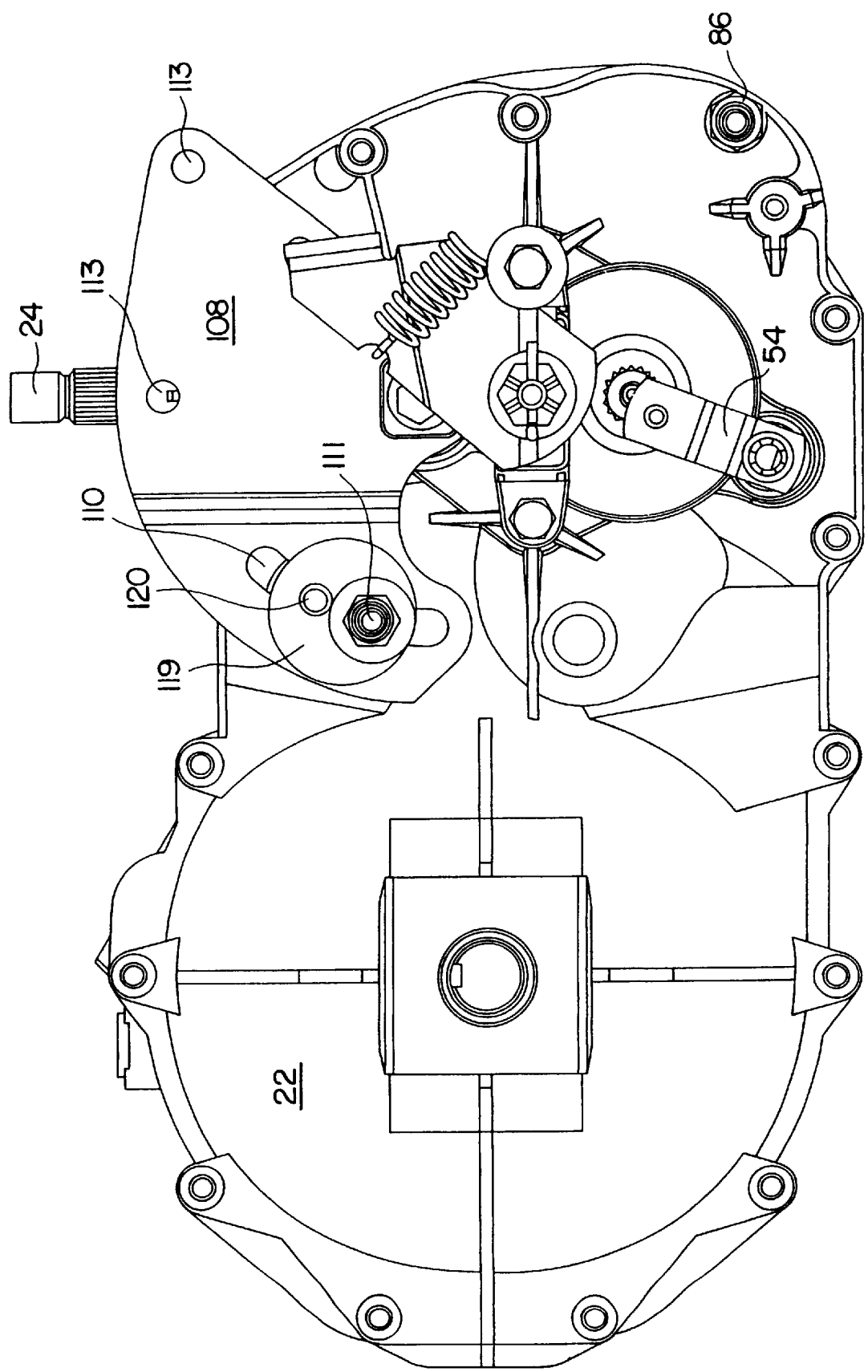

In the preferred embodiment, housing casings 21 and 22 include a plurality of through holes 102 formed therein to be used to secure the transmission to a vehicle frame. These holes can be sized as needed for the application, and the number of holes can be increased or decreased. In addition to securing the transmission to the vehicle frame through bolt holes 102, there is a need to secure the unit against rotation caused by the torque created by the unit. It is known to attach torque brackets to a vehicle and to secure them in some manner to the housing. One feature of this housing design is that the bolts 31 securing main casing 21 to side casing 22 extend all the way through both casings, as shown by way of example in FIG. 5. Bolts 31 are sized to be long enough so that torque bracket 135 can be directly mounted on bolts 31, which allows torque bracket 135 to be secured directly to the transmission housing during assembly of the transmission. This eliminates the need for separate attachment means, such as bolt holes being formed in the housing or stud 86 as shown in FIGS. 22 and 22-A, thus lowering the manufacturing costs. It also eliminates the need for a separate assembly step to secure torque bracket 135 to the transmission when the transmission is mounted on the vehicle.

An oil fill port 106 is formed in main casing 21, although it could be mounted elsewhere on the unit, and is used to fill the transmission as needed.

Figure 14:
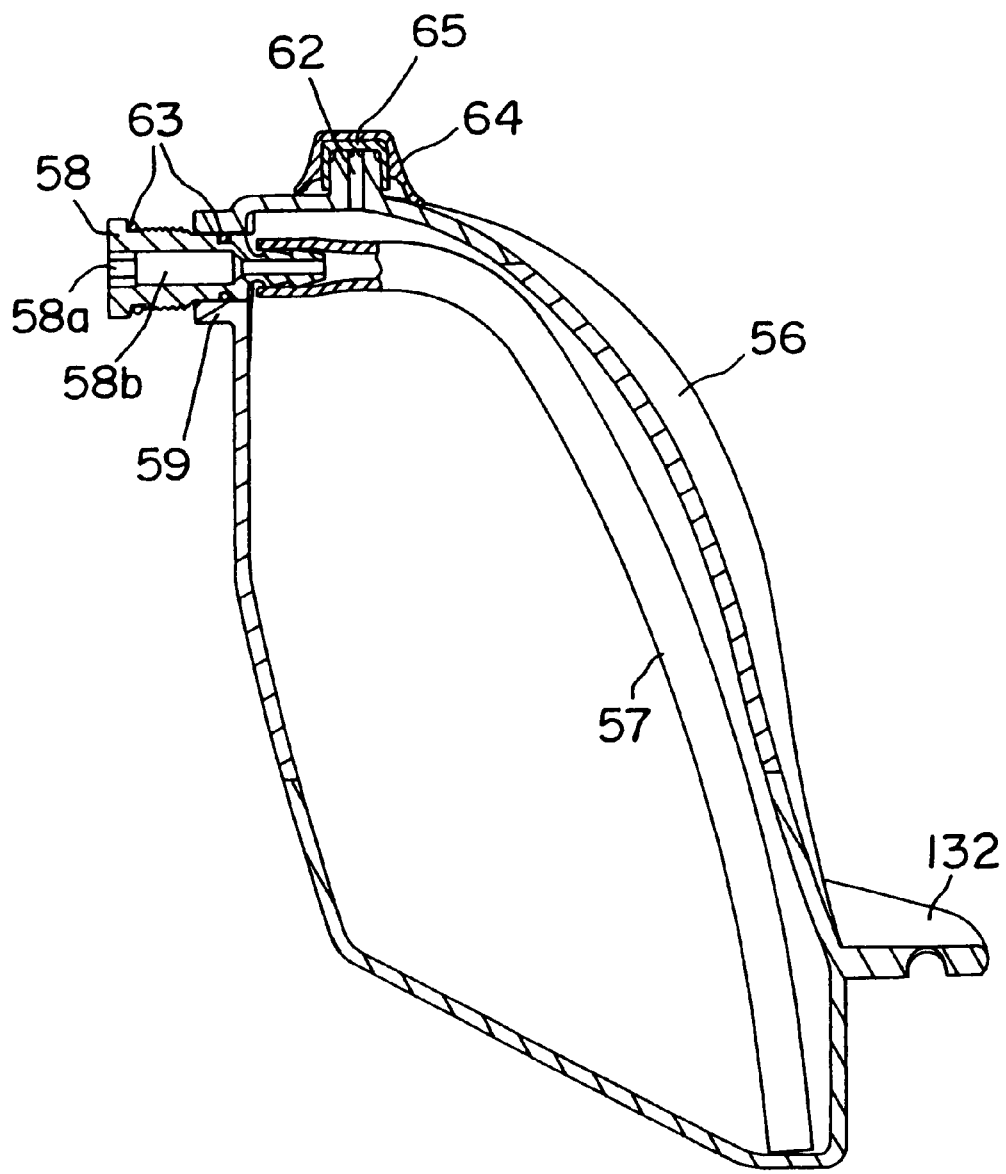
FIG. 14 is a sectional side view of the external expansion chamber of the subject invention.
Figure 14A:
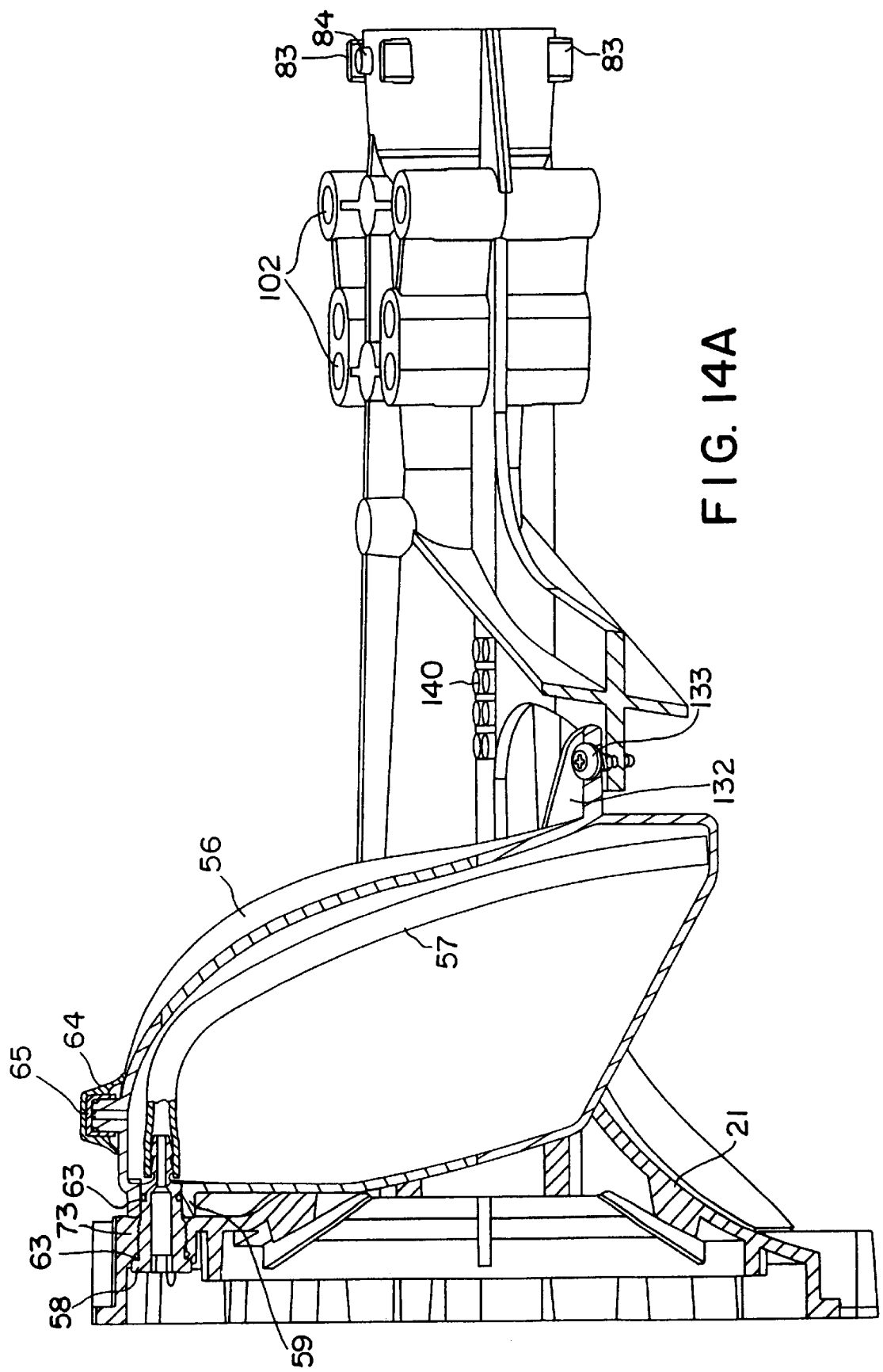
Figure 16:
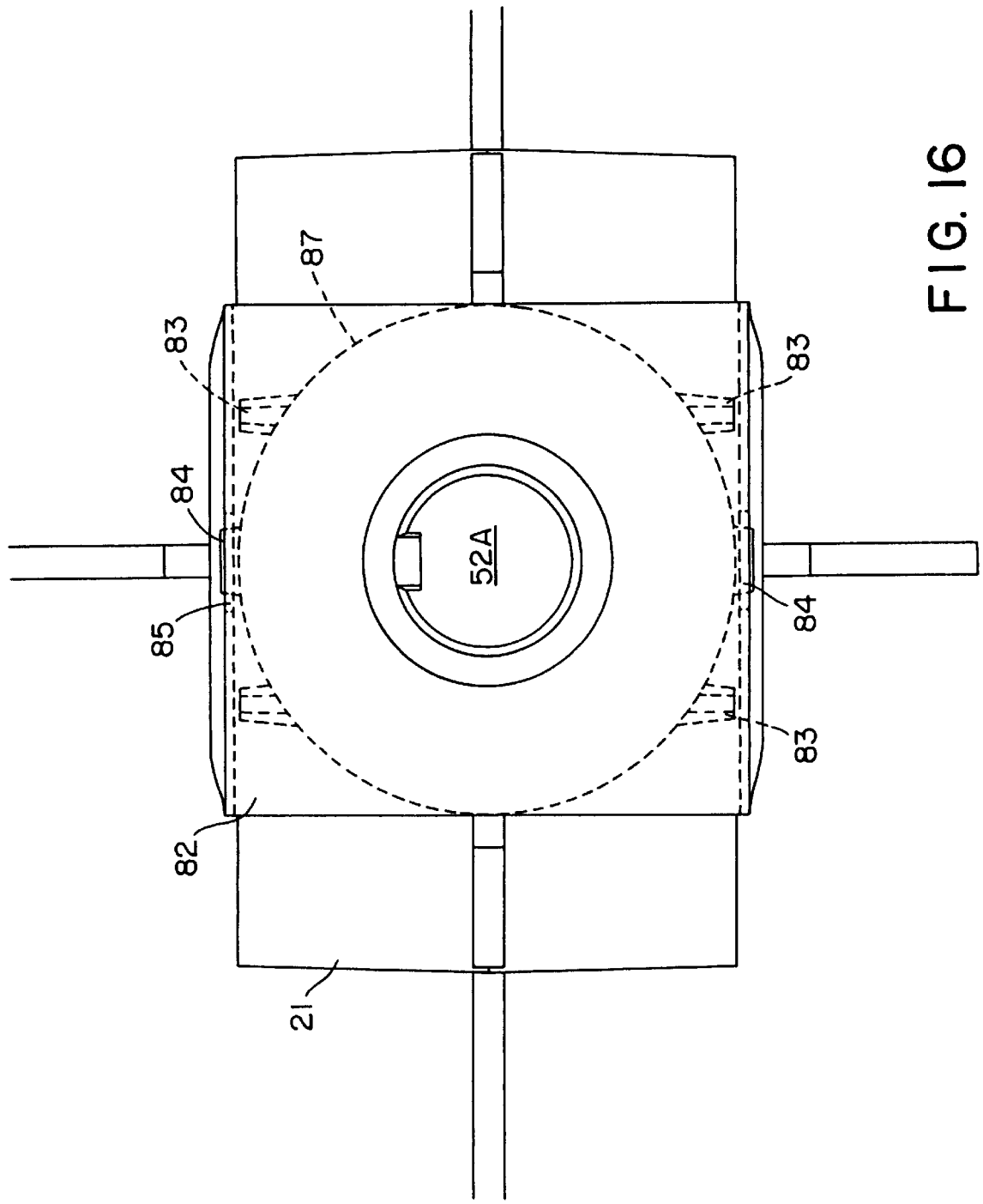
FIG. 16 is an end view of the transmission housing and locking clip shown in FIG. 15.

A further novel feature of one embodiment of the invention is in the design of the external expansion tank for hydraulic fluid. As shown most clearly in FIGS. 6, 14 and 14-A, expansion tank 56 is secured to the main casing 21 and is shaped to fit securely against main casing 21. Tab 132 extends from tank 56 and is secured to housing by use of fastener 133, which is preferably a screw. Because tank 56 is shaped to conform to the shape of transmission main casing 21, fastener 133 and fitting 58 are sufficient to hold it to the transmission.

Tube 57, which may be composed of rubber, is inserted inside tank 56 and secured to fitting 58 and is sized to fit as close to the bottom of tank 56 as possible. Tank 56, which may be composed of high density polyethylene, includes projection 59 having an opening formed therein extending therefrom and matching up to boss 73 extending from main casing 21. Fitting 58 is mounted from the inside of main casing 21 and extends into the opening of projection 59, and o-rings 63 act to prevent leakage of hydraulic fluid. Fitting 58 includes a barb-type end extending into tube 57 to provide an air-tight connection, and provides an internal passage 58a connecting passageway 58b to the internal volume of the transmission. In the preferred embodiment an internal hex is used to drive fitting 58 into main casing 21. As shown in FIG. 9, a through hole 134 is formed in main casing 21 to connect to expansion tank 26 and fitting 58 is threaded therein. In the preferred embodiment, through hole 134 should be mounted as high in the unit as possible to maximize oil fill capacity and allow for the siphoning action of tube 57. Having the tube at the highest point is also preferred to prevent excessive drainage of oil from the sump in the event an air leak develops.

Air vent 62 is formed in the tank 56 and is covered by cap 65. A unique feature is the use of an additional flexible cap 64 which acts to prevent water and other foreign contaminants from entering the tank 56 during operation or cleaning of the vehicle. Flexible cap 64 is shaped to conform to the external configuration of tank 56 and cover cap 65 in its entirety. The use of a flexible material such as nitrile for cap 64 forms enough contact with the external housing to prevent water from entering the system; in a preferred embodiment a small groove may be formed in cap 64 to allow improved air ventilation but still keep the system essentially water-tight.

During use of the hydrostatic transmission, as the hydraulic oil expands through heating it will flow through fitting 58 into tube 57 and thus into tank 56. As the oil cools and contracts, it will be drawn back in the reverse flow from tank 56 into the main housing. The placement of the open end of tube 57 adjacent the bottom of tank 56 prevents the hydraulic fluid from exiting the air vent 62 at the top of the tank regardless of the orientation of the unit during operation, thus eliminating the leakage problems inherent in other prior external tank designs.

As shown in FIGS. 1 and 1-A, axles 90A and 90B extend outwardly from axle housings 21 and 22 respectively. Vehicle wheels (not shown) may be secured to each of said axles 90A and 90B through standard means such as a retaining ring (not shown) at the ends thereof, and as discussed above, washers (not shown) may be mounted between the wheel and the housing. In order to prevent contact of the wheels or the washers with transmission casings 21 and 22, the present invention discloses use of a clip 82 to be secured on either end of the transmission. Clip 82 is preferably composed of spring steel, although other materials may be used, and such a clip could be used on any type of axle housing to prevent contact between such a housing and vehicle wheels.

FIG. 1 shows the transaxle with both clips 82 in place. Clip 82 can be secured to main casing 21 and side casing 22 through use of guide pin 84, which can be integrally formed with the housing as cast, in the preferred embodiment, or can be separate members secured to the housing in known manners. Guide pin 84 engages slot 85 in clip 82 to assist in easily locating and mounting clip 82. Clip 82 could also be secured through other methods known in the art and still accomplish the same functional benefits. Pads 83 may also be formed on main casing 21, as cast, in order to prevent rotation of clip 82 under torque, to protect pin 84 from damage. This allows for a clip 82 having a generally square or rectangular shape, as depicted, to keep costs lower. Other methods of preventing rotation of clip 82 could also be used, such as shaping clip 82 to fit the housing thrust surface 97. The curvature of clip 82 as shown in FIG. 15 aids in assembly of clip 82 to casings 21 and 22.

As shown in FIGS. 18, 19, 20, 22 and 22-A, an optional friction pack feature of the present invention includes a control arm 108 having an arcuate slot 110 formed therein. Carriage bolt 111 extends through arcuate slot 110 and engages nut 112, and is not secured to side casing 22. Friction packs 114a and 114b are mounted on bolt 111 and engage control arm 108. Packs 114a and 114b can be manufactured from a generally flexible material such as acetal and washer 115 acts to maintain rigidity against packs 114a. Spacer 116, spring 117 and washer 118 are also mounted on one end of the bolt 111 to maintain the proper level of friction.

Drag link stud 120 is threaded directly into side casing 22, and extends through openings in drag link 119, friction packs 114a and 114b and washer 115 as well as the arcuate slot 110 in control arm 108. Arcuate slot 110 acts as an external means for limiting the movement of control arm 108 to limit movement of the internal trunnion mounted swash plate.

The entire assembly can thus move within arcuate slot 110 on stud 120. Opening 113 can be used to attach control arm 108 to external linkages (not shown) of the vehicle. FIGS. 22 and 22-A show different embodiments of the external linkages of the transmission, including for example the friction pack.

A further embodiment of the differential including differential block 95 is shown in FIG. 9, where like numerals designate like elements. As is known in the art, bull or spur gears such as gear 72 used in differentials must be properly positioned and must be of sufficient strength to withstand the inherent forces. One method known in the art is to maintain the bull gear as a generally solid piece with openings formed therein as needed. However, such a gear is undesirable as it adds to the weight of the unit and the manufacture of such a solid gear as a powdered metal part requires a significantly larger press machine, thus increasing manufacturing costs. The use of block 95 allows the use of a bull gear 72 having fairly large opening 96 therein to reduce the amount of material. Block 95 is held in slots 98 formed in bull gear 72 and acts to position bull gear 72. FIG. 10-A shows a more standard arrangement of a differential block 107 in the transmission.

Figure 5:
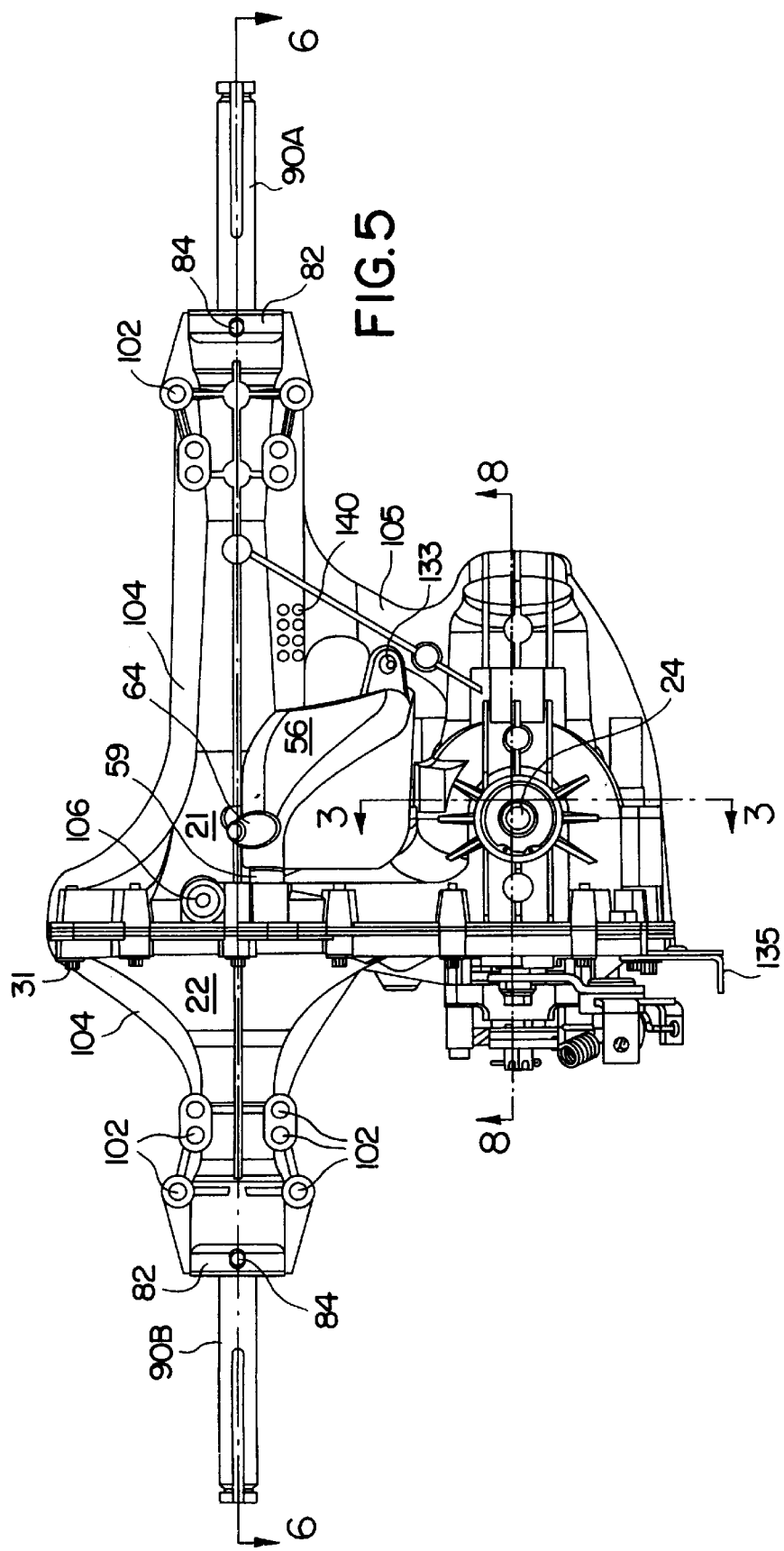
FIG. 5 is a top view of the transmission in accordance with one embodiment of the present invention.

Another optional feature of the invention is the use of an external means for recording information directly on the housing in an inexpensive and durable manner. As shown in FIGS. 5 and 22, information pads 140 consist of a series of projections formed on main casing 21 and side casing 22. The location of such a pad 140 is not critical, and pad 140 could also be formed on only one of the casings 21 and 22 instead of both. In the preferred embodiment, eight individual units are formed, and during the machining process, one or more of these individual units may be machined to encode any information the manufacturer wishes to include through the pattern of machined and un-machined projections. The use of eight individual units obviously offers a large number of coding possibilities, and the number of projections may be increased or decreased as needed.

As shown in FIG. 8, motor shaft 66 extends out of side casing 22, and is supported therein by friction bearings 141. Spline 66a engages brake disk 142. Brake arm 144 is retained by castle nut 146 and bias is provided by spring 148. As is known in the art, movement of brake arm 144 will cause yoke 149 to engage disk 142, inhibiting the rotation thereof and thereby inhibiting the rotation of motor shaft 66, slowing the vehicle. There is also a "return to neutral" feature disclosed in certain of the embodiments of the invention. FIGS. 1 and 22 show return arm 150 which engages ball bearing 152. Adjusting puck 154 is secured at the base of return arm 150.

It is to be understood that the above description of the invention should not be used to limit the invention, as other embodiments and uses of the various features of this invention will be obvious to one skilled in the art. This invention should be read as limited by the scope of its claims only.

We claim:

1. A transmission comprising
   (a) a casing having a main casing portion and a side casing portion joined along a junction surface;
   (b) said main casing portion having a first axle horn integrally formed therewith and a rib formed between the body of said main casing portion and said first axle horn;
   (c) said side casing portion having a second axle horn integrally formed therewith;
   (d) a hydrostatic transmission mounted inside said casing;
   (e) a pair of axles mounted in said casing, wherein the axis of said axles is generally perpendicular to said junction surface, and one of said axles extends out of said casing through said first axle horn of said main casing member and the other of said axles extends out of said casing through said second axle horn of said side casing member;
   (f) wherein said main casing portion and said side casing portions are shaped to conform to the shape of the hydrostatic transmission.

2. A transmission as set forth in claim 1, further comprising ribs formed on the external surfaces of said main casing portion and said side casing portion.

3. A hydrostatic transmission comprising
   (a) a casing;
   (b) a center section mounted in said casing and comprising a pump running surface and a motor running surface, where said pump running surface is perpendicular to said motor running surface;
   (c) a pump rotatably mounted on said center section and driven by an input shaft, said pump comprising a plurality of pistons;
   (d) a motor rotatably mounted on said center section and hydraulically connected to said pump;
   (e) a motor output shaft driven by said motor and being at least partially supported by said center section, wherein the axis of said motor output shaft is below the plane of said pump running surface.

* * * * *

UNITED STATES PATENT AND TRADEMARK OFFICE
CERTIFICATE OF CORRECTION

PATENT NO.   : 6,223,531 B1
DATED        : May 1, 2001
INVENTOR(S)  : Raymond M. Hauser and Michael Lee Bennett It is certified that error appears in the above-identified patent and that said Letters Patent is hereby corrected as shown below:

Title page,
Item [75], Inventors, delete "Lonnie E. Holder, John D. Schreier, and Ronald J. Sporrer" as inventors.

Column 3,
Line 19, "HITS" should be -- HSTs --

Column 6,
Line 63, "40" should be -- 50 --

Signed and Sealed this

Fifth Day of March, 2002

Attest:

JAMES E. ROGAN
*Attesting Officer*          *Director of the United States Patent and Trademark Office*